(12) United States Patent
Krüger et al.

(10) Patent No.: US 12,515,984 B2
(45) Date of Patent: Jan. 6, 2026

(54) GLASS TUBE FOR PHARMACEUTICAL CONTAINERS AND MANUFACTURING PROCESS FOR A GLASS TUBE

(71) Applicant: SCHOTT AG, Mainz (DE)

(72) Inventors: Susanne Krüger, Mainz (DE); Ulrich Lange, Mainz (DE); Peter Nass, Mainz (DE); Arne Riecke, Waldsassen (DE); Detlef Köpsel, Mainz (DE); Rainer Erwin Eichholz, Frankfurt am Main (DE); Andreas Langsdorf, Ingelheim (DE)

(73) Assignee: SCHOTT AG, Mainz (DE)

( * ) Notice: Subject to any disclaimer, the term of this patent is extended or adjusted under 35 U.S.C. 154(b) by 514 days.

(21) Appl. No.: 18/059,978

(22) Filed: Nov. 29, 2022

(65) Prior Publication Data

US 2023/0167012 A1    Jun. 1, 2023

(30) Foreign Application Priority Data

Nov. 29, 2021    (EP) ...................................... 21211118

(51) Int. Cl.
| | |
|---|---|
| *C03C 4/20* | (2006.01) |
| *A61J 1/06* | (2006.01) |
| *C03C 3/091* | (2006.01) |
| *F16L 9/10* | (2006.01) |
| *F16L 58/00* | (2006.01) |
| *C03B 17/04* | (2006.01) |

(52) U.S. Cl.
CPC .................. *C03C 4/20* (2013.01); *A61J 1/065* (2013.01); *C03C 3/091* (2013.01); *F16L 9/105* (2013.01); *F16L 58/00* (2013.01); *C03B 17/04* (2013.01); *C03C 2204/00* (2013.01)

(58) Field of Classification Search
CPC ......... C03C 4/20; C03C 2204/00; A61J 1/065
See application file for complete search history.

(56) References Cited

U.S. PATENT DOCUMENTS

| | | | |
|---|---|---|---|
| 2004/0025539 A1 | 2/2004 | Witzmann | |
| 2004/0129026 A1 | 7/2004 | Bartsch | |
| 2004/0176237 A1 | 9/2004 | Ott | |
| 2007/0197366 A1* | 8/2007 | Aoki | ....................... C03C 13/00 65/134.5 |
| 2014/0323287 A1 | 10/2014 | Tratzky | |

(Continued)

FOREIGN PATENT DOCUMENTS

| | | |
|---|---|---|
| DE | 10047850 A1 | 4/2002 |
| DE | 102011053635 | 3/2013 |

OTHER PUBLICATIONS

ISO 4802-2:2010, "Glassware—Hydrolytic resistance of the interior surfaces of glass containers—Part 2: Determination by flame spectrometry and classification", Apr. 1, 2010 (Apr. 1, 2010), pp. 1-13.

(Continued)

*Primary Examiner* — Laura A Auer
(74) *Attorney, Agent, or Firm* — Ruggiero McAllister & McMahon LLC

(57) ABSTRACT

A glass tube for pharmaceutical containers and a manufacturing process for a glass tube are provided. The glass tubes are characterized by a homogenous and low alkali leachability on the inner surface.

21 Claims, 13 Drawing Sheets

(56) References Cited

U.S. PATENT DOCUMENTS

| | | | |
|---|---|---|---|
| 2016/0009586 A1* | 1/2016 | Bookbinder | C03B 33/06 65/112 |
| 2016/0107924 A1 | 4/2016 | Yamamoto | |
| 2016/0272527 A1 | 9/2016 | Moseler | |
| 2019/0322565 A1 | 10/2019 | Witzmann | |
| 2021/0347670 A1 | 11/2021 | Lenz | |

OTHER PUBLICATIONS

DIN ISO 7884-2:1998-2, "Glass—Viscosity and viscometric fixed points—Part 2: Determination of viscosity by rotation viscometers", First Edition Dec. 15, 1987, 12 pages.

* cited by examiner

GLASS TUBE FOR PHARMACEUTICAL CONTAINERS AND MANUFACTURING PROCESS FOR A GLASS TUBE

CROSS REFERENCE TO RELATED APPLICATIONS

This application claims benefit under 35 USC § 119 of European Application 21211118.1 filed Nov. 29, 2021, the entire contents of which are incorporated herein by reference.

BACKGROUND

1. Field of the Invention

The invention relates to a glass tube for pharmaceutical containers and a manufacturing process for a glass tube. The glass tube is characterized by a homogenous and low alkali leachability on the inner surface.

2. Description of Related Art

Glass tubes for pharmaceutical containers are known and widely encountered in the medical field. The demands and standards for pharmaceutical containers are constantly increasing, aiming to provide and guarantee the quality of the transported pharmaceutical.

A typical process for the production of a glass tube for pharmaceutical containers involves a glass melt which is formed into a glass tube, for example by drawing using specially designed pipe heads, also referred to as mandrels, and technologies.

There are several problems known in the state of the art associated with glass tubes for pharmaceutical containers. Depending also on the way of production, pharmaceutical containers, such as ampoules and vials, often exhibit precipitates which originate from the volatile components in the glass compositions. During the hot forming of glass tubes, volatile components evaporate. In the further formation process of the glass tube, the volatile components condense and may form precipitates on the inner surface of the glass tube.

The described problems lead to customer dissatisfaction for several reasons. Foremost, the presence of precipitates originating from the glass compositions may hamper the quality and medical efficacy of the pharmaceutical products. Further to that, technical instabilities during the manufacturing process may lead to unacceptable variations in the amount of unwanted condensation and precipitates in the glass tube. This may result in large deviations in terms of product quality within a single batch of pharmaceutical containers. In the worst case scenario, this can lead to an entire batch which needs to be discarded merely because a small number of pharmaceutical containers does not meet a certain quality standard.

SUMMARY

It is thus an object of the invention to solve the problems known in the state of the art and to overcome the variations and instabilities during the manufacturing of glass tubes for pharmaceutical containers. In a related aspect, it is an object of the invention to provide a glass tube for pharmaceutical containers with a homogenous and reduced amount of precipitates across the entire glass tube.

In a first aspect, the invention relates to a glass tube for pharmaceutical containers, the glass tube having an inner surface and an outer surface, the glass tube having an inner diameter $d_i$ and an outer diameter $d_o$, the glass tube having a wall thickness WT and a length $l_a$, the glass tube having a longitudinal axis, wherein "hydrolytic resistance" is defined as the ratio of the alkali leachability on a section of the inner surface, determined as $Na_2O$ equivalents in an eluate prepared according to ISO 4802-2:2010, to the wall thickness, wherein a first hydrolytic resistance is determined at a first discrete section of the glass tube, and wherein a second hydrolytic resistance is determined at a second discrete section of the glass tube, wherein the absolute difference of the hydrolytic resistance determined at the first discrete section and the hydrolytic resistance determined at the second discrete section is less than 0.20 µg cm$^{-2}$ mm$^{-1}$, less than 0.15 µg cm$^{-2}$ mm$^{-1}$, or less than 0.10 µg cm$^{-2}$ mm$^{-1}$, wherein the wall thickness is 0.4 mm to 2.5 mm, 0.6 mm to 2.3 mm, 0.8 mm to 2.1 mm, or 1.0 mm to 1.8 mm, wherein the outer diameter $d_o$ is 6 mm to 55 mm, 8 mm to 50 mm, 12 mm to 45 mm, 16 mm to 40 mm, or 20 mm to 35 mm, wherein the length is from 500 to 3500 mm, wherein the first discrete section and the second discrete section are annular cross-sectional portions of the tube each extending at least 60 mm on the inner surface along the longitudinal axis.

The invention thus provides a glass tube for pharmaceutical containers which displays a homogenous hydrolytic resistance across the inner surface of the glass tube and/or a reduced amount of precipitates across the inner surface of the glass tube.

In a second aspect, the invention relates to a manufacturing process for a glass tube comprising the steps of: providing a glass drawing pipe, the glass drawing pipe having a pipe head; providing a glass melt running onto the pipe head with a substantially constant flow rate; establishing and maintaining a temperature at the pipe head, wherein the temperature lies between the T6.5 temperature corresponding to a viscosity of the glass melt of $10^{6.5}$ dPa·s and the T4.5 temperature corresponding to a viscosity of the glass melt of $10^{4.5}$ dPa·s; optionally establishing a drawing speed which corresponds to the ratio of the flow rate to a target cross section of the glass tube with a tolerance of less than 20%, or less than 10%; and establishing a normalised back diffusion density of at least 0.005 and less than 0.1.

The inventors have thereby established a manufacturing process and manufacturing conditions which displays both a homogenous hydrolytic resistance across the inner surface of the glass tube and a reduced amount of precipitates across the inner surface of the glass tube. In particular, the inventors have found that tuning a normalised back diffusion density during the manufacturing process for a glass tube, optionally in combination with adjusting a temperature at the pipe head provides for an improvement of the alkali leachability on the inner surface of the glass tube. Advantageously, the adjusting and/or controlling of a normalised back diffusion density in combination with a temperature at the pipe head allows the production of glass tubes which have a homogenous hydrolytic resistance across their inner surface, i.e., the variation in alkali leachability across the inner surface is reduced. A further or related advantage rests in the finding that the normalised back diffusion density in combination with the temperature at the pipe head provides for a reduction of the alkali leachability on the inner surface of the manufactured glass tubes. Without wishing to be bound by this theory, the underlying mechanism may be that an alkali-containing compound evaporates from the glass melt as it is formed into tube shape on the pipe head and precipitates on the inner surface of the glass tube as the tube cools further downstream.

DETAILED DESCRIPTION

Figure 1:
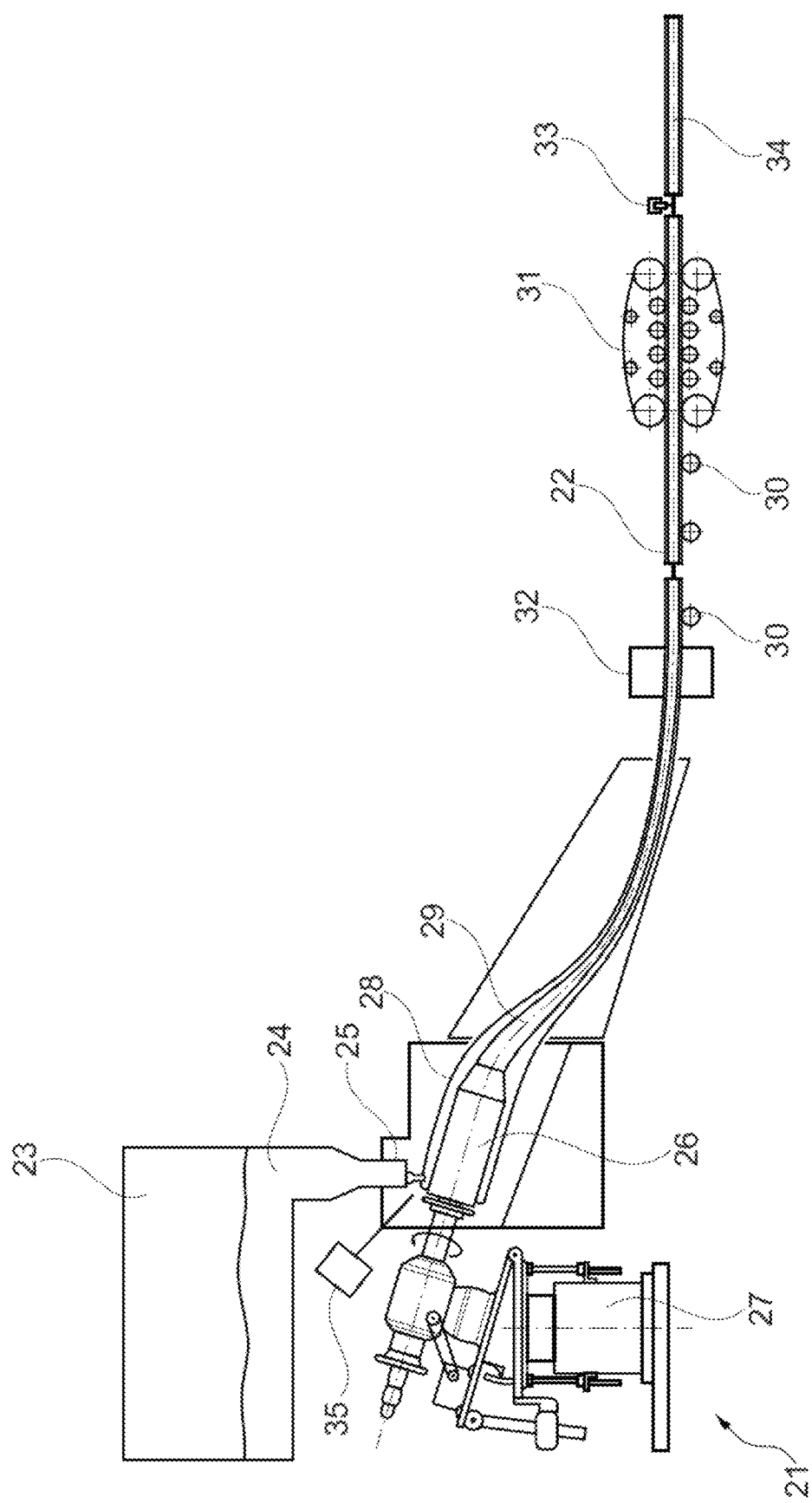
FIG. 1 shows a schematic sectional view of a manufacturing apparatus for a method according to an embodiment of the present invention.

A pharmaceutical container includes and refers to hollow glass products, such as glass tubes, glass vials, glass ampoules, glass cartridges or glass syringes.

If this description refers to geometric parameters of a glass tube, such as an inner diameter $d_i$, an outer diameter $d_o$, and a wall thickness WT, they are to be understood as average geometric parameters, i.e., an average inner diameter $d_i$, an average outer diameter $d_o$, and an average wall thickness WT, respectively, measured or measurable across the entire glass tube.

"Alkali leachability" generally refers to the property that a glass article and its surface releases alkali metal ions into an aqueous solution in contact with the glass article. In this disclosure, the "alkali leachability" is quantified in µg $Na_2O$ and normalised to the inner surface in $cm^2$ subjected to the test. Alkali metal ions that leach into a pharmaceutical product may be a problem, particularly for large biotechnologically produced molecules such as antibodies. In this disclosure, the ISO 4802-2:2010 method is used to determine "alkali leachability" in an eluate, which is described in more detail in the 'Methods and Examples' section. The "alkali leachability" is measured on the inner surface of the glass tube by determining the amount of alkali metal oxides and alkaline earth oxides in the extraction solution using flame atomic emission or absorption spectrometry (flame spectrometry).

"Glass raw materials" shall be understood as any chemical component that is suitable, in combination with other similar components, to form a glass melt and, optionally after reactions have taken place in the glass melt, a glass product. Examples of glass raw materials used in the context of the invention include, but are not limited to, the oxides of metals and metalloids, the nitrates of metals and metalloids, and the carbonates of metals and metalloids.

A "glass melt" is a volume of a batch of glass raw materials that has a viscosity of less than $10^{76}$ dPa·s. Glass (melt) viscosity can for example be measured using a rotational viscosimeter, e.g., as described in DIN ISO 7884-2:1998-2. The dependence of the viscosity on the temperature is described according to the VFT equation (Vogel-Fulcher-Tammann). During the manufacturing process according to the invention, the glass melt is heated to and at least temporarily maintained at a temperature which lies between the T6.5 temperature corresponding to a viscosity of the glass melt of $10^{6.5}$ dPa·s and the T4.5 temperature corresponding to a viscosity of the glass melt of $10^{4.5}$ dPa·s.

In this description the terms "pipe" and "mandrel", respectively "Danner pipe" and "Danner mandrel", are synonymous.

In one aspect, the invention relates to a glass tube for pharmaceutical containers, the glass tube having an inner surface and an outer surface, the glass tube having an inner diameter $d_i$ and an outer diameter $d_o$, the glass tube having a wall thickness WT and a length $l_a$, the glass tube having a longitudinal axis, wherein "hydrolytic resistance" is defined as the ratio of the alkali leachability on a section of the inner surface, determined as $Na_2O$ equivalents in an eluate prepared according to ISO 4802-2:2010, to the wall thickness, wherein a first hydrolytic resistance is determined at a first discrete section of the glass tube, and wherein a second hydrolytic resistance is determined at a second discrete section of the glass tube, wherein the absolute difference of the hydrolytic resistance determined at the first discrete section and the hydrolytic resistance determined at the second discrete section is less than 0.20 µg $cm^{-2}$ $mm^{-1}$, less than 0.15 µg $cm^{-2}$ $mm^{-1}$, or less than 0.10 µg $cm^{-2}$ $mm^{-1}$, wherein the wall thickness is 0.4 mm to 2.5 mm, 0.6 mm to 2.3 mm, 0.8 mm to 2.1 mm, or 1.0 mm to 1.8 mm, wherein the outer diameter $d_o$ is 6 mm to 55 mm, 8 mm to 50 mm, 12 mm to 45 mm, 16 mm to 40 mm, or 20 mm to 35 mm, wherein the length is from 500 to 3500 mm, wherein the first discrete section and the second discrete section are annular cross-sectional portions of the tube each extending at least 60 mm on the inner surface along the longitudinal axis.

The invention thus provides a glass tube for pharmaceutical containers which displays both a homogenous hydrolytic resistance across the inner surface of the glass tube and a reduced amount of precipitates across the inner surface of the glass tube.

The "hydrolytic resistance" is defined as the ratio of the alkali leachability on the inner surface, determined as $Na_2O$ equivalents in an eluate prepared according to ISO 4802-2:2010, to the wall thickness. The 'Methods and Examples' section describes in detail how the "hydrolytic resistance" is measured.

The "hydrolytic resistance" is measured at discrete sections on the inner surface of the glass tube, e.g., of around 1500 mm length, with the requirement that the two edges of 100 mm length are excluded from the measurement. For the purpose of comparison the "hydrolytic resistance" is measured at at least two discrete sections on the inner surface of the glass tube, but can be also measured at more than two discrete sections, i.e., up to ten discrete sections, on the inner surface of the glass tube. Both the first discrete section and the second discrete section—as well as any further discrete section—are annular cross-sectional portions of the tube each extending at least 60 mm on the inner surface along the longitudinal axis.

In one embodiment, the "hydrolytic resistance" is determined by providing a glass tube, e.g., of around 1500 mm length, with the requirement that the two edges of the glass tube of 100 mm length are excluded from the measurement, analysing at least two discrete sections on the inner surface of the glass tube, preferably eight discrete sections, or ten discrete sections, wherein the discrete sections are annular cross-sectional portions of the glass tube each extending at least 60 mm on the inner surface along the longitudinal axis, and optionally calculating statistical data for the hydrolytic resistance obtained from the discrete sections of the glass tube, e.g., an interquartile range (IQR) and optionally the presence or absence of outliers.

It is to be understood that there is no overlap between any of the discrete sections, and that measurement and calculation of the "hydrolytic resistance" can be carried out only once at each discrete section. The measurement method is based on generating an extraction solution by subjecting the discrete glass tube sections to filling with water to a specified capacity and subsequent treatment which extracts the leachable components from the glass tube sections. Irrespective of the inner diameter, outer diameter and wall thickness of the glass tube, the annular cross-sectional portions of the tube where the measurement is carried out each extend at least 60 mm on the inner surface along the longitudinal axis, in order to provide consistent and reproducible results. The skilled artisan understands and appreciates that a specific and exact length of the annular cross-sectional portions is not crucial, i.e., the annular cross-sectional portions of the tube where the measurement is carried out may extend 60 mm, 70 mm, 80 mm, or 100 mm, on the inner surface along the longitudinal axis. Because the "hydrolytic resistance" is based on the alkali leachability with respect to the inner surface, quantified as $Na_2O$ equivalents inn $cm^{-2}$, and then divided by the wall thickness of the glass tube, the "hydrolytic resistance" is independent of the chosen length of the annular cross-sectional portions of the tube where the measurement is carried out.

In this context, it is also understood that the maximal number of discrete sections that can be measured for any given glass tube is limited by the length of the glass tube and the chosen length of the annular cross-sectional portions of the tube where the measurement is carried out, with the requirement that the two edges of 100 mm length are excluded from the measurement. That entails that the maximal number of discrete sections that can be measured is at best exactly equal or smaller than the quotient of the length of the glass tube and the chosen length of the annular cross-sectional portions.

A first hydrolytic resistance is determined at a first discrete section of the glass tube, and a second hydrolytic resistance is determined at a second discrete section of the glass tube, with the requirement that the two edges of 100 mm length are excluded from the measurement. It is to be understood that for a glass tube of any given length $l_a$, it does not matter where the first discrete section and the second discrete section is exactly located within the glass tube. In other words, both the first discrete section and the second discrete section can be located at any possible location within the glass tube, with the proviso that there can be no (physical) overlap between the first discrete section and the second discrete section. Subsequently, the absolute difference of the hydrolytic resistance determined at the first discrete section and the hydrolytic resistance determined at the second discrete section is calculated.

According to the invention, the absolute difference of the hydrolytic resistance determined at the first discrete section and the hydrolytic resistance determined at the second discrete section is less than 0.20 $\mu g\ cm^{-2}\ mm^{-1}$, less than 0.15 $\mu g\ cm^{-2}\ mm^{-1}$, or less than 0.10 $\mu g\ cm^{-2}\ mm^{-1}$. Advantageously, the glass tube for pharmaceutical containers displays a homogenous hydrolytic resistance across the inner surface of the glass tube, irrespective of the exact locations where the hydrolytic resistance is determined.

In one embodiment of the glass tube for pharmaceutical containers, the glass tube has a wall thickness WT of 0.4 mm to 2.5 mm, 0.6 mm to 2.3 mm, 0.8 mm to 2.1 mm, or 1.0 mm to 1.8 mm. In one embodiment of the glass tube for pharmaceutical containers, the glass tube has a wall thickness WT of at least 0.4 mm, at least 0.6 mm, at least 0.8 mm, or at least 1.0 mm. In one embodiment of the glass tube for pharmaceutical containers, the glass tube has a wall thickness WT of 2.5 mm or less, 2.3 mm or less, 2.1 mm or less, or 1.8 mm or less.

In one embodiment of the glass tube for pharmaceutical containers, the glass tube has an outer diameter $d_o$ of 6 mm to 55 mm, 8 mm to 50 mm, 12 mm to 45 mm, 16 mm to 40 mm, or 20 mm to 35 mm. In one embodiment of the glass tube for pharmaceutical containers, the glass tube has an outer diameter $d_o$ of at least 6 mm, at least 8 mm, at least 12 mm, at least 16 mm, or at least 20 mm. In one embodiment of the glass tube for pharmaceutical containers, the glass tube has an outer diameter $d_o$ of 55 mm or less, 50 mm or less, 45 mm or less, 40 mm or less, or 35 mm or less.

In one embodiment of the glass tube for pharmaceutical containers, the glass tube has a length of from 500 to 3500 mm, 1000 to 3000 mm, or 1500 to 2500 mm. In one embodiment of the glass tube for pharmaceutical containers, the glass tube has a length of at least 500 mm, at least 1000 mm, or at least 1500 mm. In one embodiment of the glass tube for pharmaceutical containers, the glass tube has a length of 3500 mm or less, 3000 mm or less, or 2500 mm or less.

In one embodiment of the glass tube for pharmaceutical containers, the glass tube has an inner diameter $d_i$ from 4 to 51 mm, 6 mm to 46 mm, 10 mm to 41 mm, 16 mm to 40 mm, or 20 mm to 35 mm. In one embodiment of the glass tube for pharmaceutical containers, the glass tube has an inner diameter $d_i$ of at least 4 mm, at least 6 mm, at least 10 mm, at least 14 mm, or at least 18 mm. In one embodiment of the glass tube for pharmaceutical containers, the glass tube has an inner diameter $d_i$ of 51 mm or less, 46 mm or less, 41 mm or less, 40 mm or less, or 35 mm or less.

In one embodiment, determination of the alkali leachability on a section of the glass tube, determined as $Na_2O$ equivalents in an eluate prepared according to ISO 4802-2:2010, comprises cutting the glass tube in segments of a length of at least 60 mm, capping a segment at one open end with a rubber plug, and filling the capped segment with distilled water, wherein the filling volume with distilled water is determined according to point 7.2.1 or point 7.2.2 of ISO 4802-2:2010.

In one embodiment, determination of the alkali leachability on a section of the glass tube, determined as $Na_2O$ equivalents in an eluate prepared according to ISO 4802-2:2010, comprises cutting the glass tube in two segments or eight segments, wherein the segments have a length of 60 mm to 100 mm, capping the segments at one open end with a rubber plug, and filling the capped segments with distilled water, wherein the filling volume with distilled water is determined according to point 7.2.1 or point 7.2.2 of ISO 4802-2:2010.

In one embodiment of the glass tube for pharmaceutical containers, the first hydrolytic resistance and/or the second hydrolytic resistance is less than 0.5 µg cm$^{-2}$ mm$^{-1}$, less than 0.4 cm$^{-2}$ mm$^{-1}$, less than 0.3 cm$^{-2}$ mm$^{-1}$, less than 0.2 cm$^{-2}$ mm$^{-1}$, or less than 0.1 cm$^{-2}$ mm$^{-1}$. It is to be understood that the first hydrolytic resistance and the second hydrolytic resistance are independent of each other and will not be exactly identical. However, it is also understood, in view of the above, that the first hydrolytic resistance and the second hydrolytic resistance are similar to each other and will not strongly deviate.

In one embodiment of the glass tube for pharmaceutical containers, the first hydrolytic resistance and/or the second hydrolytic resistance is at least 0.01 µg cm$^{-2}$ mm$^{-1}$, at least 0.02 µg cm$^{-2}$ mm$^{-1}$, at least 0.03 µg cm$^{-2}$ mm$^{-1}$, at least 0.04 µg cm$^{-2}$ mm$^{-1}$, or at least 0.05 µg cm$^{-2}$ mm$^{-1}$. In one embodiment of the glass tube for pharmaceutical containers, the first hydrolytic resistance and/or the second hydrolytic resistance is from 0.01 to 0.5 µg cm$^{-2}$ mm$^{-1}$, 0.02 to 0.4 µg cm$^{-2}$ mm$^{-1}$, 0.03 to 0.3 µg cm$^{-2}$ mm$^{-1}$, 0.04 to 0.2 µg cm$^2$ mm$^{-1}$, or 0.05 to 0.1 µg cm$^2$ mm$^{-1}$.

Advantageously, the hydrolytic resistance of the glass tube for pharmaceutical containers may be low and/or may be reduced in view of the state of the art, which is reflected in both the first hydrolytic resistance and the second hydrolytic resistance which may be measured at any location on the inner surface of the glass tube. Thereby, certain problems associated with glass tubes in the state of the art are alleviated and/or completely removed, to the effect that the amount of certain contaminants is partially reduced and/or substantially reduced. This has a positive bearing on the pharmaceutical containers produced from the glass tube, e.g., the quality of pharmaceutical products can be better maintained over time and is not hampered by the pharmaceutical container itself.

In one embodiment of the glass tube for pharmaceutical containers, the glass tube has a wall thickness of 1.0 mm to 2.0 mm, wherein the first hydrolytic resistance and/or the second hydrolytic resistance is less than 0.3 µg cm$^{-2}$ mm$^{-1}$, less than 0.25 µg cm$^{-2}$ mm$^{-1}$, or less than 0.2 µg cm$^{-2}$ mm$^{-1}$. Both the first hydrolytic resistance may be less than 0.3 µg cm$^{-2}$ mm$^{-1}$, less than 0.25 µg cm$^{-2}$ mm$^{-1}$, or less than 0.2 µg cm$^{-2}$ mm$^{-1}$ and the second hydrolytic resistance is less than 0.3 µg cm$^{-2}$ mm$^{-1}$, less than 0.25 µg cm$^{-2}$ mm$^{-1}$, or less than 0.2 µg cm$^{-2}$ mm$^{-1}$. In one embodiment of the glass tube for pharmaceutical containers, the glass tube has a wall thickness of 1.0 mm to 2.0 mm, wherein the first hydrolytic resistance and/or the second hydrolytic resistance is at least 0.02 µg cm$^{-2}$ mm$^{-1}$, at least 0.04 µg cm$^{-2}$ mm$^{-1}$, or at least 0.06 µg cm$^{-2}$ mm$^{-1}$. In one embodiment of the glass tube for pharmaceutical containers, the glass tube has a wall thickness of 1.0 mm to 2.0 mm, wherein the first hydrolytic resistance and/or the second hydrolytic resistance is from 0.02 to 0.3 µg cm$^{-2}$ mm$^{-1}$, 0.04 to 0.25 µg cm$^{-2}$ mm$^{-1}$, or 0.06 to 0.2 µg cm$^2$ mm$^1$.

In one embodiment of the glass tube for pharmaceutical containers, the glass tube has a wall thickness of 2.0 mm to 2.5 mm, wherein the first hydrolytic resistance and/or the second hydrolytic resistance is less than 0.2 µg cm$^{-2}$ mm$^{-1}$, less than 0.15 µg cm$^{-2}$ mm$^{-1}$, or less than 0.1 µg cm$^{-2}$ mm$^{-1}$. In one embodiment, the glass tube has a wall thickness of 2.0 mm to 2.5 mm, wherein the first hydrolytic resistance and/or the second hydrolytic resistance is at least 0.01 µg cm$^{-2}$ mm$^{-1}$, at least 0.02 µg cm$^{-2}$ mm$^{-1}$, or at least 0.03 µg cm$^{-2}$ mm$^{-1}$. In one embodiment, the glass tube has a wall thickness of 2.0 mm to 2.5 mm, wherein the first hydrolytic resistance and/or the second hydrolytic resistance is from 0.01 to 0.2 µg cm$^{-2}$ mm$^{-1}$, 0.02 to 0.15 µg cm$^{-2}$ mm$^{-1}$, or 0.03 to 0.1 µg cm$^{-2}$ mm$^{-1}$.

In one embodiment of the glass tube for pharmaceutical containers, the glass tube has an outer diameter $d_o$ of 16 mm to 55 mm, wherein the first hydrolytic resistance and/or the second hydrolytic resistance is less than 0.30 µg cm$^{-2}$ mm$^{-1}$, less than 0.25 µg cm$^{-2}$ mm$^{-1}$, or less than 0.20 µg cm$^{-2}$ mm$^{-1}$. In one embodiment, the glass tube has an outer diameter $d_o$ of 16 mm to 55 mm, wherein the first hydrolytic resistance and/or the second hydrolytic resistance is at least 0.02 µg cm$^{-2}$ mm$^{-1}$, at least 0.04 µg cm$^{-2}$ mm$^{-1}$, or at least 0.06 µg cm$^{-2}$ mm$^{-1}$. In one embodiment, the glass tube has an outer diameter $d_o$ of 16 mm to 55 mm, wherein the first hydrolytic resistance and/or the second hydrolytic resistance is from 0.02 to 0.3 µg cm$^{-2}$ mm$^{-1}$, 0.04 to 0.25 µg cm$^{-2}$ mm$^{-1}$, or 0.06 to 0.2 µg cm$^{-2}$ mm$^{-1}$.

In one embodiment of the glass tube for pharmaceutical containers, the first discrete section and the second discrete section are at least 400 mm distant from one another, at least 600 mm, at least 800 mm, or at least 1000 mm. In one embodiment of the glass tube for pharmaceutical containers, the first discrete section and the second discrete section are 3100 mm distant from one another or less, 2800 mm or less, 2500 mm or less, or 2000 mm or less. In one embodiment of the glass tube for pharmaceutical containers, the first discrete section and the second discrete section are 400 mm to 3100 mm distant from one another, 600 mm to 2800 mm, 800 mm to 2500 mm, or 1000 mm to 2000 mm.

In one embodiment of the glass tube for pharmaceutical containers, a third hydrolytic resistance is determined at a third discrete section of the glass tube, wherein a fourth hydrolytic resistance is determined at a fourth discrete section of the glass tube, wherein a fifth hydrolytic resistance is determined at a fifth discrete section of the glass tube, wherein a sixth hydrolytic resistance is determined at a sixth discrete section of the glass tube, wherein a seventh hydrolytic resistance is determined at a seventh discrete section of the glass tube, and wherein an eighth hydrolytic resistance is determined at an eighth discrete section of the glass tube, wherein the third discrete section, the fourth discrete section, the fifth discrete section, the sixth discrete section, the seventh discrete section, and the eighth discrete section are annular cross-sectional portions of the tube each extending at least 60 mm on the inner surface along the longitudinal axis, wherein the statistical results obtained for the hydrolytic resistance from the eight discrete sections of an individual glass tube are characterised by an interquartile range (IQR) of less than 0.08 µg cm$^{-2}$ mm$^{-1}$, or less than 0.06 µg cm$^{-2}$ mm$^{-1}$.

The determination of the hydrolytic resistance the third discrete section, the fourth discrete section, the fifth discrete section, the sixth discrete section, the seventh discrete section, and the eighth discrete section are carried out in line with the above description and are carried out specifically in the same manner as for the first discrete section and the second discrete section.

In one embodiment, the absolute difference of the hydrolytic resistance, determined at the first discrete section, the second discrete section, the third discrete section, the fourth discrete section, the fifth discrete section, the sixth discrete section, the seventh discrete section, and the eighth discrete section, is less than 0.20 µg cm$^{-2}$ mm$^{-1}$, less than 0.15 µg cm$^{-2}$ mm$^{-1}$, or less than 0.10 µg cm$^{-2}$ mm$^{-1}$, between the maximum value and the minimum value out of the values for the first discrete section, the second discrete section, the third discrete section, the fourth discrete section, the fifth discrete section, the sixth discrete section, the seventh discrete section, and the eighth discrete section.

In one embodiment, the third discrete section, the fourth discrete section, the fifth discrete section, the sixth discrete section, the seventh discrete section, and the eighth discrete section are annular cross-sectional portions of the tube each extending at least 60 mm on the inner surface along the longitudinal axis. A specific and exact length of the annular cross-sectional portions is not crucial, i.e., the annular cross-sectional portions of the tube where the measurement is carried out may extend 60 mm, 70 mm, 80 mm, or 100 mm, on the inner surface along the longitudinal axis.

In one embodiment, the first discrete section, the second discrete section, the third discrete section, the fourth discrete section, the fifth discrete section, the sixth discrete section, the seventh discrete section, and the eighth discrete section are annular cross-sectional portions of the tube each extending at least 60 mm on the inner surface along the longitudinal axis.

In one embodiment, the first discrete section, the second discrete section, the third discrete section, the fourth discrete section, the fifth discrete section, the sixth discrete section, the seventh discrete section, and the eighth discrete section are annular cross-sectional portions of the tube each extending 60 mm on the inner surface along the longitudinal axis, 70 mm, 80 mm, or 100 mm.

It is to be understood that there is no specific order among and no specific distance between the first discrete section, the second discrete section, the third discrete section, the fourth discrete section, the fifth discrete section, the sixth discrete section, the seventh discrete section, and the eighth discrete section on the inner surface of the glass tube. It is also understood that there can be no overlap between any of the first discrete section, the second discrete section, the third discrete section, the fourth discrete section, the fifth discrete section, the sixth discrete section, the seventh discrete section, and the eighth discrete section, as the measurement of leachable components can be carried out only once. The method is based on generating an extraction solution by subjecting the discrete glass tube sections to filling with water to a specified capacity and subsequent heat treatment which extracts the leachable components from the glass tube sections.

In one embodiment, the batch of glass tubes comprises at least ten individual glass tubes, at least 20 individual glass tubes, at least 50 individual glass tubes, or at least 100 individual glass tubes. In one embodiment, the batch of glass tubes comprises 1000 individual glass tubes or less, or 500 individual glass tubes or less.

Statistical results are obtained for the hydrolytic resistance from the eight discrete sections of an individual glass tube, i.e., from the first discrete section, the second discrete section, the third discrete section, the fourth discrete section, the fifth discrete section, the sixth discrete section, the seventh discrete section, and the eighth discrete section. These results are subjected to e.g., boxplot analysis, from which e.g., the interquartile range (IQR) can be deduced and the presence or absence of statistical outliers can be derived.

A boxplot is a known way of displaying a statistical dataset and typically includes the minimum, the maximum, the median of the dataset, the first quartile and the third quartile. The presence or absence of statistical outliers depends on the first quartile and the third quartile, and are not considered as the minimum or maximum. The median is the middle value of the dataset, also referred to as the $50^{th}$ percentile or as the second quartile. The first quartile, respectively the lower quartile, is the median of the lower half of the dataset, also referred to as the $25^{th}$ percentile. The third quartile, respectively the upper quartile, is the median of the upper half of the dataset, also referred to as the $75^{th}$ percentile. The interquartile range (IQR) is the distance between the first quartile and the third quartile. The percentiles have been calculated using the linear interpolation between closest ranks-method with constant C=0.

Within the present invention, the lower whisker is at a distance within 1.5 times the IQR and represents the closest value to 1.5 times the IQR measured below the first quartile, and the upper whisker is at a distance within 1.5 times the IQR and represents the closest value to 1.5 times the IQR measured above the third quartile. Statistical outliers within a dataset are defined as data points outside the range spanned by the upper whisker and the lower whisker. However in the data of FIGS. 6A-6D, the lower whisker would not go beyond the minimum value of the dataset, and the upper whisker would not go beyond the maximum value of the dataset. Provided that outliers are present, based on the described mathematical criterion, these outliers are neither considered a minimum value nor a maximum value.

In one embodiment, the statistical results obtained for the hydrolytic resistance from the eight discrete sections of an individual glass tube have an interquartile range (IQR) of less than $0.08 \, \mu g \, cm^2 \, mm^{-1}$, or less than $0.06 \, \mu g \, cm^{-2} \, mm^{-1}$.

In one embodiment, the statistical results obtained for the hydrolytic resistance from the eight discrete sections of an individual glass tube have an interquartile range (IQR) of $0.01 \, \mu g \, cm^{-2} \, mm^{-1}$ or more, or $0.02 \, \mu g \, cm^{-2} \, mm^{-1}$ or more.

In one embodiment, the statistical results obtained for the hydrolytic resistance from the eight discrete sections of an individual glass tube have an interquartile range (IQR) of $0.01 \, \mu g \, cm^2 \, mm^{-1}$ to $0.08 \, \mu g \, cm^{-2} \, mm^{-1}$, or $0.02 \, \mu g \, cm^2 \, mm^{-1}$ to $0.06 \, \mu g \, cm^2 \, mm^{-1}$.

Advantageously, the glass tube for pharmaceutical containers displays a homogenous hydrolytic resistance across the inner surface of the glass tube, irrespective of the exact locations of the eight discrete sections where the hydrolytic resistance has been determined.

Set of Glass Tubes

In a further and/or related aspect, the invention relates to a set comprising at least 9 glass tubes, or at least 50 glass tubes, or at least 100 glass tubes. In one embodiment, the invention relates to a set comprising 1000 glass tubes or less, or 500 glass tubes or less, or 300 glass tubes or less.

In one embodiment of the set, statistical results are obtained for the hydrolytic resistance from the eight discrete sections of each individual glass tube, wherein at least 90% of the glass tubes of the set are characterised by one or more of the following parameters: the interquartile range (IQR) is less than $0.04 \, \mu g \, cm^{-2} \, mm^{-1}$, or less than $0.03 \, \mu g \, cm^{-2} \, mm^{-1}$; there are no statistical outliers, which are defined as data points outside the range spanned by an upper whisker and a lower whisker, wherein the lower whisker is at a distance within 1.5 times the IQR and represents the closest value to 1.5 times the IQR measured below the first quartile and wherein the upper whisker is at a distance within 1.5 times the IQR and represents the closest value to 1.5 times the IQR measured above the third quartile.

In one embodiment of the set, 80% of the glass tubes of the set are characterised by a hydrolytic resistance, obtained from the eight discrete sections of an individual glass tube, having an IQR of less than $0.04 \, \mu g \, cm^{-2} \, mm^{-1}$, or less than $0.03 \, \mu g \, cm^{-2} \, mm^{-1}$.

In one embodiment of the set, 90% of the glass tubes of the set are characterised by a hydrolytic resistance, obtained from the eight discrete sections of an individual glass tube, having an IQR of less than 0.04 μg cm$^{-2}$ mm$^{-1}$, or less than 0.03 μg cm$^{-2}$ mm$^{-1}$.

In one embodiment of the set, 95% of the glass tubes of the set are characterised by a hydrolytic resistance, obtained from the eight discrete sections of an individual glass tube, having an IQR of less than 0.04 μg cm$^{-2}$ mm$^{-1}$, or less than 0.03 μg cm$^{-2}$ mm$^{-1}$.

In one embodiment of the set, 80% of the glass tubes of the set are characterised by a hydrolytic resistance, obtained from the eight discrete sections of an individual glass tube, having an IQR of 0.01 μg cm$^{-2}$ mm$^{-1}$ or more, or 0.02 μg cm$^{-2}$ mm$^{-1}$ or more.

In one embodiment of the set, 90% of the glass tubes of the set are characterised by a hydrolytic resistance, obtained from the eight discrete sections of an individual glass tube, having an IQR of 0.01 μg cm$^{-2}$ mm$^{-1}$ or more, or 0.02 μg cm$^{-2}$ mm$^{-1}$ or more.

In one embodiment of the set, 95% of the glass tubes of the set are characterised by a hydrolytic resistance, obtained from the eight discrete sections of an individual glass tube, having an IQR of 0.01 μg cm$^{-2}$ mm$^{-1}$ or more, or 0.02 μg cm$^{-2}$ mm$^{-1}$ or more.

In one embodiment of the set, 80% of the glass tubes of the set are characterised by a hydrolytic resistance, obtained from the eight discrete sections of an individual glass tube, having an IQR of 0.01 μg cm$^{-2}$ mm$^{-1}$ to 0.04 μg cm$^{-2}$ mm$^{-1}$.

In one embodiment of the set, 90% of the glass tubes of the set are characterised by a hydrolytic resistance, obtained from the eight discrete sections of an individual glass tube, having an IQR of 0.01 μg cm$^{-2}$ mm$^{-1}$ to 0.04 μg cm$^{-2}$ mm$^{-1}$.

In one embodiment of the set, 95% of the glass tubes of the set are characterised by a hydrolytic resistance, obtained from the eight discrete sections of an individual glass tube, having an IQR of 0.01 μg cm$^{-2}$ mm$^{-1}$ to 0.04 μg cm$^{-2}$ mm$^{-1}$.

In one embodiment of the set, 80% of the glass tubes of the set are characterised by the parameter that there are no statistical outliers, which are defined as data points outside the range spanned by an upper whisker and a lower whisker, wherein the lower whisker is at a distance within 1.5 times the IQR and represents the closest value to 1.5 times the IQR measured below the first quartile and wherein the upper whisker is at a distance within 1.5 times the IQR and represents the closest value to 1.5 times the IQR measured above the third quartile.

In one embodiment of the set, 90% of the glass tubes of the set are characterised by the parameter that there are no statistical outliers, which are defined as data points outside the range spanned by an upper whisker and a lower whisker, wherein the lower whisker is at a distance within 1.5 times the IQR and represents the closest value to 1.5 times the IQR measured below the first quartile and wherein the upper whisker is at a distance within 1.5 times the IQR and represents the closest value to 1.5 times the IQR measured above the third quartile.

In one embodiment of the set, 95% of the glass tubes of the set are characterised by the parameter that there are no statistical outliers, which are defined as data points outside the range spanned by an upper whisker and a lower whisker, wherein the lower whisker is at a distance within 1.5 times the IQR and represents the closest value to 1.5 times the IQR measured below the first quartile and wherein the upper whisker is at a distance within 1.5 times the IQR and represents the closest value to 1.5 times the IQR measured above the third quartile.

Glass Composition

In one embodiment of the glass tube for pharmaceutical containers, the glass tube comprises a glass composition selected from the list of soda-lime glass, borosilicate glass, aluminosilicate glass, a glass comprising from 5 to 20 mol % $B_2O_3$, based on all oxides present in the glass composition.

In one embodiment of the glass tube for pharmaceutical containers, the glass tube comprises a glass composition comprising 5 to 20 mol % $B_2O_3$ and/or 2 to 10 mol % $Na_2O$. Optionally, the glass composition comprises 60 to 85 mol % $SiO_2$, 5 to 20 mol % $B_2O_3$, 2 to 10 mol % $Al_2O_3$, 0 to 2 mol % $Fe_2O_3$, 2 to 10 mol % $Na_2O$, 0 to 5 mol % $K_2O$, 0 to 2 mol % BaO, 0 to 2 mol % CaO, and/or 0 to 10 mol % $TiO_2$, based on all oxides present in the glass composition.

In one embodiment, the glass composition comprises at least 60 mol % $SiO_2$, at least 62 mol % $SiO_2$, at least 64 mol % $SiO_2$, at least 66 mol % $SiO_2$, or at least 68 mol % $SiO_2$, based on all oxides present in the glass composition. In one embodiment, the glass composition comprises 85 mol % $SiO_2$ or less, 83 mol % $SiO_2$ or less, 81 mol % $SiO_2$ or less, 79 mol % $SiO_2$ or less, or 77 mol % $SiO_2$ or less, based on all oxides present in the glass composition. In one embodiment, the glass composition comprises 60 to 85 mol % $SiO_2$, 62 to 83 mol % $SiO_2$, 64 to 81 mol % $SiO_2$, 66 to 79 mol % $SiO_2$, or 68 to 77 mol % $SiO_2$, based on all oxides present in the glass composition.

In one embodiment, the glass composition comprises at least 5.0 mol % $B_2O_3$, at least 5.5 mol % $B_2O_3$, at least 6.0 mol % $B_2O_3$, at least 6.5 mol % $B_2O_3$, or at least 7.0 mol % $B_2O_3$, based on all oxides present in the glass composition. In one embodiment, the glass composition comprises 20.0 mol % $B_2O_3$ or less, 18.0 mol % $B_2O_3$ or less, 16.0 mol % $B_2O_3$ or less, 14.0 mol % $B_2O_3$ or less, or 12.0 mol % $B_2O_3$ or less, based on all oxides present in the glass composition. In one embodiment, the glass composition comprises 5.0 to 20.0 mol % $B_2O_3$, 5.5 to 18.0 mol % $B_2O_3$, 6.0 to 16.0 mol % $B_2O_3$, 6.5 to 14.0 mol % $B_2O_3$, or 7.0 to 12.0 mol % $B_2O_3$, based on all oxides present in the glass composition.

In one embodiment, the glass composition comprises at least 2.0 mol % $Al_2O_3$, at least 3.0 mol % $Al_2O_3$, at least 4.0 mol % $Al_2O_3$, or at least 5.0 mol % $Al_2O_3$, based on all oxides present in the glass composition. In one embodiment, the glass composition comprises 10.0 mol % $Al_2O_3$ or less, 9.0 mol % $Al_2O_3$ or less, 8.0 mol % $Al_2O_3$ or less, or 7.0 mol % $Al_2O_3$ or less, based on all oxides present in the glass composition. In one embodiment, the glass composition comprises 2.0 to 10.0 mol % $Al_2O_3$, 3.0 to 9.0 mol % $Al_2O_3$, 4.0 to 8.0 mol % $Al_2O_3$, or 5.0 to 7.0 mol % $Al_2O_3$, based on all oxides present in the glass composition.

In one embodiment, the glass composition comprises at least 0 mol % $Fe_2O_3$, at least 0.2 mol % $Fe_2O_3$, or at least 0.5 mol % $Fe_2O_3$, based on all oxides present in the glass composition. In one embodiment, the glass composition comprises 2.0 mol % $Fe_2O_3$ or less, 1.5 mol % $Fe_2O_3$ or less, or 1.2 mol % $Fe_2O_3$ or less, based on all oxides present in the glass composition. In one embodiment, the glass composition comprises 0 to 2.0 mol % $Fe_2O_3$, 0.2 to 1.5 mol % $Fe_2O_3$, or 0.5 to 1.2 mol % $Fe_2O_3$, based on all oxides present in the glass composition.

In one embodiment, the glass composition comprises at least 2 mol % $Na_2O$, at least 4 mol % $Na_2O$, or at least 6 mol % $Na_2O$, based on all oxides present in the glass composition. In one embodiment, the glass composition comprises 10 mol % $Na_2O$ or less, 9 mol % $Na_2O$ or less, or 8 mol % $Na_2O$ or less, based on all oxides present in the glass composition. In one embodiment, the glass composition comprises 2 to 10 mol % $Na_2O$, 4 to 9 mol % $Na_2O$, or 6 to 8 mol % $Na_2O$, based on all oxides present in the glass composition.

In one embodiment, the glass composition comprises at least 0.0 mol % $K_2O$, at least 0.2 mol % $K_2O$, or at least 0.5 mol % $K_2O$, based on all oxides present in the glass composition. In one embodiment, the glass composition comprises 5.0 mol % $K_2O$ or less, 3.5 mol % $K_2O$ or less, 2.5 mol % $K_2O$ or less, 2.0 mol % $K_2O$ or less, or 1.5 mol % $K_2O$ or less, based on all oxides present in the glass composition. In one embodiment, the glass composition comprises 0.0 to 5.0 mol % $K_2O$, 0.2 to 3.5 mol % $K_2O$, or 0.5 to 2.5 mol % $K_2O$, based on all oxides present in the glass composition.

In one embodiment, the glass composition comprises at least 0.0 mol % BaO, at least 0.2 mol % BaO, or at least 0.5 mol % BaO, based on all oxides present in the glass composition. In one embodiment, the glass composition comprises 3.0 mol % BaO or less, 2.5 mol % BaO or less, or 2.0 mol % BaO or less, based on all oxides present in the glass composition. In one embodiment, the glass composition comprises 0.0 to 3.0 mol % BaO, 0.2 to 2.5 mol % BaO, or 0.5 to 2.0 mol % BaO, based on all oxides present in the glass composition.

In one embodiment, the glass composition comprises at least 0.0 mol % CaO, at least 0.2 mol % CaO, or at least 0.5 mol % CaO, based on all oxides present in the glass composition. In one embodiment, the glass composition comprises 3.0 mol % CaO or less, 2.5 mol % CaO or less, or 2.0 mol % CaO or less, based on all oxides present in the glass composition. In one embodiment, the glass composition comprises 0.0 to 3.0 mol % CaO, 0.2 to 2.5 mol % CaO, or 0.5 to 2.0 mol % CaO, based on all oxides present in the glass composition.

In one embodiment, the glass composition comprises at least 0.0 mol % $TiO_2$, at least 1.0 mol % $TiO_2$, at least 2.0 mol % $TiO_2$, at least 3.0 mol % $TiO_2$, or at least 4.0 mol % $TiO_2$, based on all oxides present in the glass composition. In one embodiment, the glass composition comprises 10.0 mol % $TiO_2$ or less, 9.0 mol % $TiO_2$ or less, 8.0 mol % $TiO_2$ or less, 7.0 mol % $TiO_2$ or less, or 6.0 mol % $TiO_2$ or less, based on all oxides present in the glass composition. In one embodiment, the glass composition comprises 0.0 to 10.0 mol % $TiO_2$, 1.0 to 9.0 mol % $TiO_2$, 2.0 to 8.0 mol % $TiO_2$, 3.0 to 7.0 mol % $TiO_2$, or 4.0 to 6.0 mol % $TiO_2$, based on all oxides present in the glass composition.

In one embodiment of the glass tube for pharmaceutical containers, the glass tube comprises a glass composition, wherein the glass composition comprises one or more fining agents, e.g., a fining agent selected from the list of arsenic oxide, antimony oxide, tin oxide, cerium oxide, chlorides, sulfates and combinations thereof.

It is advantageous to use a fining agent in the glass composition to allow for bubble formation and bubble escape from the glass melt during the production process of the glass tube for pharmaceutical containers.

In one embodiment of the glass tube for pharmaceutical containers, the glass composition comprises a fining agent selected from the list of arsenic oxide, antimony oxide, and tin oxide.

In one embodiment of the glass tube for pharmaceutical containers, the glass composition comprises a fining agent selected from the list of chlorides, sulfates and combinations thereof.

Manufacturing Process

In a second aspect, the invention relates to a manufacturing process for a glass tube comprising the steps of: providing a glass drawing pipe, the glass drawing pipe having a pipe head; providing a glass melt running onto the pipe head with a substantially constant flow rate; establishing and maintaining a temperature at the pipe head, wherein the temperature lies between the T6.5 temperature corresponding to a viscosity of the glass melt of $10^{6.5}$ dPa·s and the T4.5 temperature corresponding to a viscosity of the glass melt of $10^{4.5}$ dPa·s; and optionally establishing a drawing speed which corresponds to the ratio of the flow rate to a target cross section of the glass tube with a tolerance of less than 20%, or less than 10%; establishing a normalised back diffusion density of at least 0.005 and less than 0.1.

The inventors have thereby established a manufacturing process and manufacturing conditions which provides for the production of a glass tube for pharmaceutical containers which displays both a homogenous hydrolytic resistance across the inner surface of the glass tube and a reduced amount of precipitates across the inner surface of the glass tube.

The following preferred embodiments equally relate to the manufacturing process of the second aspect and the third aspect of the invention.

In one embodiment of the manufacturing process, providing a glass drawing pipe, the glass drawing pipe having a pipe head, comprises providing a manufacturing apparatus suitable for drawing a glass tube, wherein the apparatus comprises a feed tank containing a glass melt, an outlet for the glass melt, such that the glass melt is provided on an outer surface of a rotating conical pipe.

In one embodiment of the manufacturing process, the conical pipe may rotate about an axis essentially parallel to the drawing direction. In one embodiment, the conical pipe is obliquely downwardly inclined, optionally at an angle between 1° and 15° with respect to a horizontal orientation, or at an angle between 3° and 10°. In one embodiment, the conical pipe is driven by a power unit.

In one embodiment of the manufacturing process, a hollow glass melt body is drawn from the conical pipe in a predetermined direction toward a front end. In one embodiment, compressed air is blown through the conical pipe into the glass tube during drawing. Advantageously, blowing compressed air through the conical pipe prevents the hollow glass melt body from collapsing.

In one embodiment, the manufacturing process provides a glass melt running onto the pipe head with a substantially constant flow rate. In one embodiment, the step of providing a glass melt, optionally comprising volatile components, comprises melting a batch of glass raw materials, optionally comprising boric oxide, in a melting tank to form a glass melt, as well as heating the glass raw materials and/or the glass melt using at least one fuel burner.

In one embodiment of the manufacturing process, a substantially constant flow rate refers to a flow rate which deviates between 98 and 102% based on a mean flow rate during a continuous process, or 99.5 and 100.5%, or 99.9 and 100.1%. In one embodiment, the manufacturing process provides a glass melt running onto the pipe head with a substantially constant flow rate, wherein the substantially constant flow rate is between 50 and 1000 kg glass melt per hour, or between 100 and 800 kg glass melt per hour.

In one embodiment of the manufacturing process, the drawing speed at the lower end of the pipe head is between 0.014 and 16.5 m s$^{-1}$, 0.05 and 11.5 m s$^{-1}$, 0.1 and 3.5 m s$^{-1}$, 0.2 and 1.5 m s$^{-1}$, or 0.3 and 1.0 m s$^{-1}$. In one embodiment of the manufacturing process, the drawing speed at the lower end of the pipe head is at least 0.014, at least 0.05, at least 0.1, at least 0.2, or at least 0.3. In one embodiment of the manufacturing process, the drawing speed at the lower end of the pipe head is 16.5 m s$^{-1}$ or less, 11.5 m s$^{-1}$ or less, 3.5 m s$^{-1}$ or less, 1.5 m s$^{-1}$ or less, or 1.0 m s$^{-1}$ or less.

In one embodiment of the manufacturing process, a temperature at the pipe head which lies between the T6.5 temperature corresponding to a viscosity of the glass melt of $10^{6.5}$ dPa·s and the T4.5 temperature corresponding to a viscosity of the glass melt of $10^{4.5}$ dPa·s is established and/or maintained. Advantageously, this temperature range establishes and provides for a substantially constant flow rate during the step of running the glass melt onto the pipe head.

In one embodiment of the manufacturing process, a temperature at the pipe head between 800° C. and 1300° C. is established, between 850° C. and 1200° C., between 900° C. and 1100° C., or between 950° C. and 1050° C.

In one embodiment of the manufacturing process, a drawing speed is established which corresponds to the ratio of the flow rate to a target cross section of the glass tube with a tolerance of less than 20%, less than 10%, or less than 5%, with respect to the average drawing speed during the process. It is to be understood that at a certain flow rate of the glass melt, the drawing speed has a direct bearing on the target cross section of the glass tube which is characterised by the inner diameter, the outer diameter and the wall thickness of the glass tube. In this context, it is also understood that the amount of material provided during the process is conserved. Any material loss resulting from evaporation during the process may be neglected and/or may be less than 0.01%, based on the weight of the glass melt.

In one embodiment of the manufacturing process, a drawing speed is established which corresponds to the ratio of the flow rate to a target cross section of the glass tube with a tolerance of at least 1%, at least 2%, or at least 3%, with respect to the average drawing speed during the process. In one embodiment of the manufacturing process, a drawing speed is established which corresponds to the ratio of the flow rate to a target cross section of the glass tube with a tolerance of 1% to 20%, 2% to 10%, or 3% to 5%.

In one embodiment of the manufacturing process, conditions are established such that an inverse elongation of $A_Z/A_R$ of at least 0.003 and less than 0.06 is obtained, wherein $A_Z$ is the inner surface area of an initial glass tube section extending from the pipe head to about 0.15 m downstream from the pipe head, and $A_R$ is the inner surface area of an equal mass of glass melt which begins at about 0.8 m downstream from the pipe head.

Figure 3:
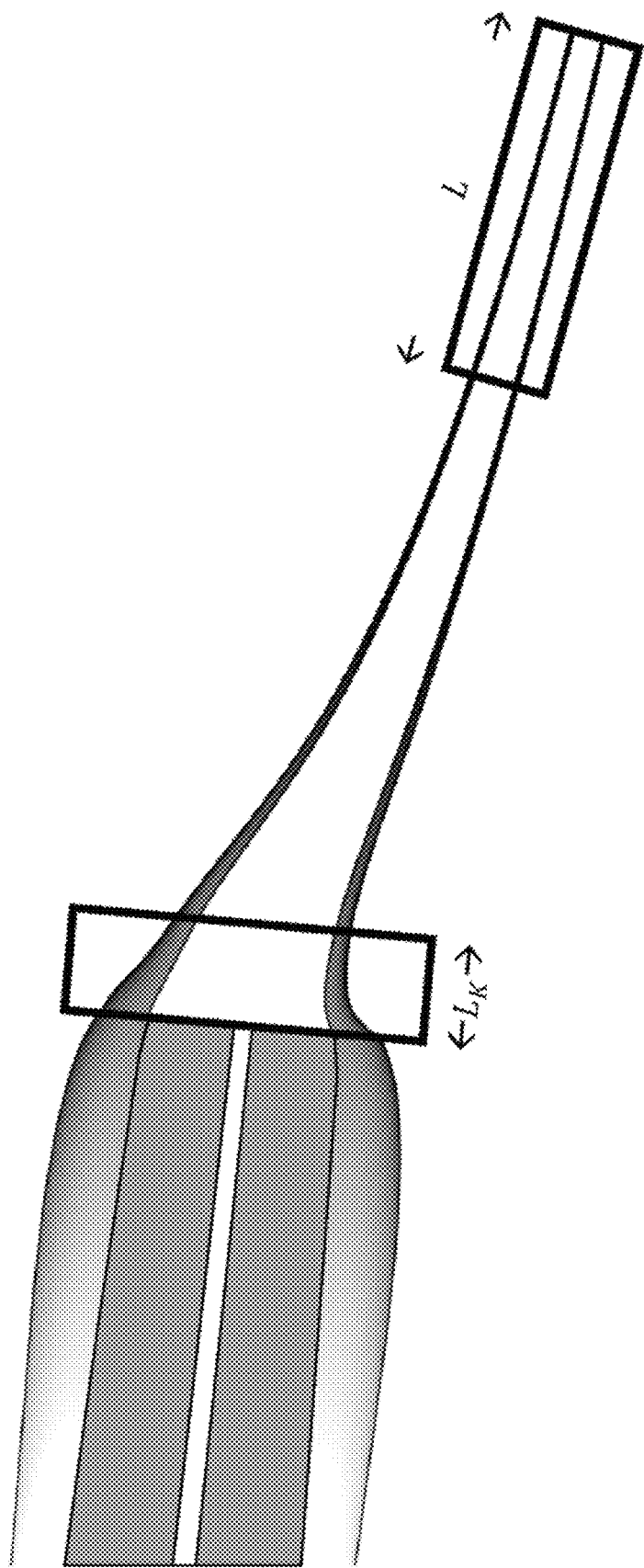
FIG. 3 shows a diagram graph illustrating the dimensions of the pipe head in combination with the glass melt during the drawing process into a glass tube.

Referring to FIG. 3, $A_Z$ is the inner surface area of an initial glass tube section extending from the pipe head, which is by definition at a distance of 0.00 m, to about 0.15 m downstream from the pipe head, thus covering a length $L_K$ of about 0.15 m. $A_R$ is the inner surface area of an equal mass of glass melt at about 0.8 m downstream from the pipe head, i.e., with respect to FIG. 3, i.e., covering a length L of approximately 0.40 m, from—in this exemplary case— about 0.8 m to about 1.2 m.

The inverse elongation is accessible by measurement, estimation and calculation and is for example accessible via the following equation $$\frac{A_Z}{A_R} = \frac{2\pi R_{i,K} L_K}{2\pi d_i L} = \frac{WT}{D_K} * \frac{R_{i,K}}{2R_{i,K} + D_K} * \frac{2d_o - WT}{d_o - WT}$$

wherein 2 $R_{i,K}$ is the inner diameter at the lower end of the pipe head, 2 $d_o$ is the outer diameter of the final glass tube, 2 $d_i$ is the inner diameter of the final glass tube, WT is the wall thickness of the final glass tube, and $D_K$ is the wall thickness at the lower end of the pipe head.

The skilled artisan knows how to establish and adjust the drawing speed and the flow rate with respect to each other, in order to achieve a certain inverse elongation, as well as in order to achieve a glass tube with certain dimensions, such as e.g., inner diameter $d_i$, outer diameter $d_o$, and wall thickness WT.

In one embodiment of the manufacturing process, the inverse elongation $A_Z/A_R$ is at least 0.003, at least 0.006, or at least 0.01. In one embodiment of the manufacturing process, the inverse elongation $A_Z/A_R$ is 0.06 or less, 0.05 or less, or 0.04 or less. In one embodiment of the manufacturing process, the inverse elongation $A_Z/A_R$ is 0.003 to 0.06, 0.006 to 0.05, or 0.01 to 0.04. In an alternative embodiment, the inverse elongation $A_Z/A_R$ is 0.003 to 0.02. In an alternative embodiment, the inverse elongation $A_Z/A_R$ is 0.02 to 0.06, or 0.03 to 0.05.

In one embodiment, the invention relates to a manufacturing process for a glass tube comprising the steps of: providing a glass drawing pipe, the glass drawing pipe having a pipe head; providing a glass melt running onto the pipe head with a substantially constant flow rate; establishing and maintaining a temperature at the pipe head, wherein the temperature lies between the T6.5 temperature corresponding to a viscosity of the glass melt of $10^{6.5}$ dPa·s and the T4.5 temperature corresponding to a viscosity of the glass melt of $10^{4.5}$ dPa·s; establishing a drawing speed which corresponds to the ratio of the flow rate to a target cross section of the glass tube with a tolerance of less than 20%, or less than 10%; establishing a pull-off rate with a tolerance of less than 20%, or less than 10%, such that a normalised back diffusion density of at least 0.005 and less than 0.1 is obtained; and establishing an inverse elongation of $A_Z/A_R$ of at least 0.003 and less than 0.06 is obtained, wherein $A_Z$ is the inner surface area of an initial glass tube section extending from the pipe head to about 0.15 m downstream from the pipe head, and $A_R$ is the inner surface area of an equal mass of glass melt at about 0.8 m downstream from the pipe head.

In a third aspect, the invention relates to a manufacturing process for a glass tube comprising the steps of: providing a glass drawing pipe, the glass drawing pipe having a pipe head; providing a glass melt running onto the pipe head with a substantially constant flow rate; establishing and maintaining a temperature at the pipe head, wherein the temperature lies between the T6.5 temperature corresponding to a viscosity of the glass melt of $10^{6.5}$ dPa·s and the T4.5 temperature corresponding to a viscosity of the glass melt of $10^{4.5}$ dPa·s; and establishing a pull-off rate with a tolerance of less than 20%, or less than 10%; establishing an inverse elongation of $A_Z/A_R$ of at least 0.003 and less than 0.06 is obtained, wherein $A_Z$ is the inner surface area of an initial glass tube section extending from the pipe head to about 0.15 m downstream from the pipe head, and $A_R$ is the inner surface area of an equal mass of glass melt at about 0.8 m downstream from the pipe head.

The pull-off rate is defined as the amount of glass melt that is drawn from the lower end of the pipe head. Within the present disclosure, the pull-off rate is linked to two conditions. First, the pull-off rate is controlled in such a way that it is subjected to only minimal fluctuations, expressed as a tolerance of less than 20%, or less than 10%. Second, the pull-off rate influences and provides for a normalised back diffusion density of at least 0.005 and less than 0.1, i.e., irrespective of the pull-off rate and its fluctuation, a normalised back diffusion density of at least 0.005 and less than 0.1 is obtained.

The normalised back diffusion density $v_{RN}$ may be equated to $$v_{RN} = \frac{A_Z}{A_R} \cdot (1 + c_1 \cdot \dot{V}_L)$$

wherein the constant $c_1$ has been established by optimisation based on an empirical model and is about 0.46 h m$^{-3}$. $\dot{V}_L$ is the volumetric flow rate of the blowing air in the so-called drawing onion, which is by definition in the section starting from the lower end of the pipe head to 0.8 m downstream from the pipe head. In one embodiment, the constant $c_1$ is about 0.46 h m$^{-3}$, and has a tolerance of ±20%, or ±10%. The constant $c_1$ mainly depends on air temperatures in the glass tube strand during manufacture and may thus vary. In one embodiment, the constant $c_i$ is between 0.37 and 0.55 h m$^{-3}$.

The inventors have established a positive correlation between the normalised back diffusion density $v_{RN}$ and the alkali leachability of the obtained glass tube. Advantageously, a normalised back diffusion density of at least 0.005 and less than 0.1 provides for excellent to good results of manufactured glass tubes.

In one embodiment of the manufacturing process, the normalised back diffusion density is at least 0.005, or at least 0.01. In one embodiment of the manufacturing process, the normalised back diffusion density is 0.10 or less, or 0.06 or less. In one embodiment of the manufacturing process, the normalised back diffusion density is 0.005 to 0.1, or 0.01 to 0.06. In an alternative embodiment, the normalised back diffusion density is 0.005 to 0.06. In an alternative embodiment, the normalised back diffusion density is 0.02 to 0.05.

In one embodiment of the manufacturing process, the normalised back diffusion density is minimised by simultaneously minimising the inverse elongation $A_Z/A_R$, lowering the temperature at the pipe head and by choosing a pipe geometry according to the inner diameter of the tube that allows reduction of the blowing air volume.

In one embodiment of the manufacturing process, the pull-off rate is 50 to 1000 kg h$^{-1}$, 100 to 900 kg h$^{-1}$, 200 to 800 kg h$^{-1}$, 300 to 700 kg h$^{-1}$, or 400 to 600 kg h$^{-1}$. In one embodiment of the manufacturing process, the pull-off rate is at least 50 kg h$^{-1}$, at least 100 kg h$^{-1}$, at least 200 kg h$^{-1}$, at least 300 kg h$^{-1}$, or at least 400 kg h$^{-1}$. In one embodiment of the manufacturing process, the pull-off rate is 1000 kg h$^{-1}$ or less, 900 kg h$^{-1}$ or less, 800 kg h$^{-1}$ or less, 700 kg h$^{-1}$ or less, or 600 kg h$^{-1}$ or less.

In one embodiment, the manufacturing process comprises a step of establishing and/or maintaining an excess pressure between 0 and 1000 Pa at the lower end of the pipe head. It is to be understood that the glass melt first runs onto the pipe head with a substantially constant flow rate and that drawing of the glass melt establishes and provides an initial glass tube section extending from the end of the pipe head to about 0.15 m downstream from the lower end of the pipe head. In this respect, it may be desirable to establish and/or maintain an excess pressure between 0 and 1000 Pa at the lower end of the pipe head, which is effective inside the drawn initial glass tube section, as compared to the outside of the drawn initial glass tube section.

In one embodiment, the manufacturing process comprises a step of establishing and/or maintaining a volumetric flow rate of the blowing air $\dot{V}_L$ of 0.2 to 12 m$^3$ h$^{-1}$, 0.4 to 10 m$^3$ h$^{-1}$, 0.8 to 8.0 m$^3$ h$^{-1}$, or 1.2 to 6.0 m$^3$ h$^{-1}$, or 2.0 to 4.0 m$^3$ h$^{-1}$.

Advantageously, minimising the excess pressure at the lower end of the pipe head and/or minimising the volumetric flow rate of the blowing air during the manufacturing process may reduce the alkali leachability in the obtained glass tubes. The excess pressure at the lower end of the pipe head positively correlates with the volumetric flow rate of the blowing air in the glass tube during manufacture. In view of the parameters influencing the normalised back diffusion density $v_{RN}$ (cf. the above equation) it becomes clear that an increase in the volumetric flow rate of the blowing air brings about an enhanced normalised back diffusion density.

In one embodiment, the manufacturing process comprises a step of establishing and/or maintaining an excess pressure between 0 and 1000 Pa inside the drawn initial glass tube section, as compared to the outside of the drawn initial glass tube section.

In one embodiment, the manufacturing process comprises a step of establishing and/or maintaining an excess pressure of at least 10 Pa at the lower end of the pipe head, at least 50 Pa, or at least 100 Pa. In one embodiment, the manufacturing process comprises a step of establishing and/or maintaining an excess pressure of 1000 Pa or less at the lower end of the pipe head, 500 Pa or less, or 300 Pa or less. In one embodiment, the manufacturing process comprises a step of establishing and/or maintaining an excess pressure of 10 Pa to 1000 Pa at the lower end of the pipe head, 50 Pa to 500 Pa, or 100 Pa to 300 Pa.

In one embodiment, the manufacturing process comprises a step of establishing and/or maintaining an excess pressure of at least 10 Pa inside the drawn initial glass tube section, as compared to the outside of the drawn initial glass tube section, at least 50 Pa, or at least 100 Pa. In one embodiment, the manufacturing process comprises a step of establishing and/or maintaining an excess pressure of 1000 Pa or less inside the drawn initial glass tube section, as compared to the outside of the drawn initial glass tube section, 400 Pa or less, or 300 Pa or less. In one embodiment, the manufacturing process comprises a step of establishing and/or maintaining an excess pressure of 10 Pa to 1000 Pa inside the drawn initial glass tube section, as compared to the outside of the drawn initial glass tube section, 50 Pa to 500 Pa, or 100 Pa to 300 Pa.

In one embodiment of the manufacturing process, the process is a Danner process.

In one embodiment of the manufacturing process, the flow rate and the drawing speed are adjusted to obtain glass tubes with an outer diameter $d_o$ from 6 to 55 mm and a wall thickness of 0.4 mm to 2.5 mm. Advantageously, the manufacturing process allows adjusting the flow rate and the drawing speed to the end that the dimensions of the obtained glass tubes can be controlled and steered according to consumer needs.

In one embodiment of the manufacturing process, the flow rate and the drawing speed are adjusted to obtain glass tubes with an outer diameter $d_o$ from 6 to 55 mm and a wall thickness WT of 0.4 mm to 2.5 mm, an outer diameter $d_o$ from 8 to 50 mm and a wall thickness WT of 0.6 mm to 2.3 mm, an outer diameter $d_o$ from 12 to 45 mm and a wall thickness WT of 0.6 mm to 2.3 mm, an outer diameter $d_o$ from 16 to 30 mm and a wall thickness WT of 1.0 mm to 1.2 mm, or an outer diameter $d_o$ from 20 to 35 mm and a wall thickness WT of 1.0 mm to 1.8 mm.

In a further aspect, the invention relates to a glass tube obtainable or produced by a manufacturing process according to the invention.

In one embodiment, a glass tube obtainable or produced by the manufacturing process has a first hydrolytic resistance determined at a first discrete section of the glass tube, and a second hydrolytic resistance determined at a second discrete section of the glass tube, wherein the absolute difference of the hydrolytic resistance determined at the first discrete section and the hydrolytic resistance determined at the second discrete section is less than 0.20 µg cm$^{-2}$ mm$^{-1}$, less than 0.15 µg cm$^{-2}$ mm$^{-1}$, or less than 0.10 µg cm$^{-2}$ mm$^{-1}$, wherein the wall thickness WT is 0.4 mm to 2.5 mm, 0.6 mm to 2.3 mm, 0.8 mm to 2.1 mm, or 1.0 mm to 1.8 mm, wherein the outer diameter $d_o$ is 6 mm to 55 mm, 8 mm to 50 mm, 12 mm to 45 mm, 16 mm to 40 mm, or 20 mm to 35 mm, wherein the length is from 500 to 3500 mm, wherein the first discrete section and the second discrete section are annular cross-sectional portions of the tube each extending at least 60 mm on the inner surface along the longitudinal axis.

In one embodiment, a glass tube obtainable or produced by the manufacturing process is characterized in that the first hydrolytic resistance and/or the second hydrolytic resistance is less than 0.5 µg cm$^{-2}$ mm$^{-1}$, less than 0.4 µg cm$^{-2}$ mm$^{-1}$, less than 0.3 µg cm$^{-2}$ mm$^{-1}$, less than 0.2 µg cm$^{-2}$ mm$^{-1}$, or less than 0.1 µg cm$^{-2}$ mm$^{-1}$.

In one embodiment, a glass tube obtainable or produced by the manufacturing process is characterized in that the glass tube has a wall thickness of 1.0 mm to 2.0 mm, and wherein the first hydrolytic resistance and/or the second hydrolytic resistance is less than 0.3 µg cm$^{-2}$ mm$^{-1}$, less than 0.25 µg cm$^{-2}$ mm$^{-1}$, or less than 0.2 µg cm$^{-2}$ mm$^{-1}$, or the glass tube has a wall thickness of 2.0 mm to 2.5 mm, and wherein the first hydrolytic resistance and/or the second hydrolytic resistance is less than 0.2 µg cm$^{-2}$ mm$^{-1}$, less than 0.15 µg cm$^{-2}$ mm$^{-1}$, or less than 0.1 µg cm$^{-2}$ mm$^{-1}$, or the glass tube has an outer diameter $d_o$ of 16 mm to 55 mm, and wherein the first hydrolytic resistance and/or the second hydrolytic resistance is less than 0.30 µg cm$^{-2}$ mm$^{-1}$, less than 0.25 µg cm$^{-2}$ mm$^{-1}$, or less than 0.20 µg cm$^{-2}$ mm$^{-1}$.

In one embodiment, a glass tube obtainable or produced by the manufacturing process is characterized in that the statistical results obtained for the hydrolytic resistance from the eight discrete sections of an individual glass tube are characterised by an interquartile range (IQR) of less than 0.04 µg cm$^{-2}$ mm$^{-1}$, or less than 0.03 µg cm$^{-2}$ mm$^{-1}$.

In one embodiment, a glass tube, optionally obtainable or produced by the manufacturing process, wherein the glass tube comprises a glass composition comprising 5 to 20 mol % $B_2O_3$ and/or 2 to 10 mol % $Na_2O$, and the glass tube is characterized by an absolute difference of the first hydrolytic resistance determined at the first discrete section and the second hydrolytic resistance determined at the second discrete section of less than 0.20 µg cm$^{-2}$ mm$^{-1}$, wherein the wall thickness WT is 1.0 mm to 1.8 mm, wherein the outer diameter $d_o$ is 20 mm to 35 mm, wherein the length is from 1000 to 2500 mm, wherein the first hydrolytic resistance and/or the second hydrolytic resistance is less than 0.5 µg cm$^{-2}$ mm$^{-1}$, less than 0.4 µg cm$^{-2}$ mm$^{-1}$, less than 0.3 µg cm$^2$ mm$^{-1}$, less than 0.2 µg cm$^{-2}$ mm$^{-1}$, or less than 0.1 µg cm$^{-2}$ mm$^{-1}$.

In one embodiment, a glass tube, optionally obtainable or produced by the manufacturing process, wherein the glass tube comprises a glass composition comprising 5 to 20 mol % $B_2O_3$ and/or 2 to 10 mol % $Na_2O$, and the glass tube is characterized by an absolute difference of the first hydrolytic resistance determined at the first discrete section and the second hydrolytic resistance determined at the second discrete section of less than 0.20 µg cm$^{-2}$ mm$^{-1}$, wherein the wall thickness WT is 1.0 mm to 1.8 mm, wherein the outer diameter $d_o$ is 20 mm to 35 mm, wherein the length is from 1000 to 2500 mm, wherein the first hydrolytic resistance and/or the second hydrolytic resistance is less than 0.5 µg cm$^{-2}$ mm$^{-1}$, wherein a third hydrolytic resistance is determined at a third discrete section of the glass tube, a fourth hydrolytic resistance is determined at a fourth discrete section of the glass tube, a fifth hydrolytic resistance is determined at a fifth discrete section of the glass tube, a sixth hydrolytic resistance is determined at a sixth discrete section of the glass tube, a seventh hydrolytic resistance is determined at a seventh discrete section of the glass tube, and an eighth hydrolytic resistance is determined at an eighth discrete section of the glass tube, wherein the first discrete section, the second discrete section, the third discrete section, the fourth discrete section, the fifth discrete section, the sixth discrete section, the seventh discrete section, and the eighth discrete section are annular cross-sectional portions of the tube each extending at least 60 mm on the inner surface along the longitudinal axis, wherein the statistical results obtained for the hydrolytic resistance from the eight discrete sections of an individual glass tube are characterised by an interquartile range (IQR) is less than 0.08 µg cm$^{-2}$ mm$^{-1}$, or less than 0.06 µg cm$^{-2}$ mm$^{-1}$.

In one embodiment, a glass tube, optionally obtainable or produced by the manufacturing process, wherein the glass tube comprises a glass composition comprising 5 to 20 mol % $B_2O_3$ and/or 2 to 10 mol % $Na_2O$, and the glass tube is characterized by an absolute difference of the first hydrolytic resistance determined at the first discrete section and the second hydrolytic resistance determined at the second discrete section of less than 0.20 µg cm$^{-2}$ mm$^{-1}$, wherein the wall thickness WT is 1.0 mm to 1.8 mm, wherein the outer diameter $d_o$ is 20 mm to 35 mm, wherein the length is from 1000 to 2500 mm, wherein a third hydrolytic resistance is determined at a third discrete section of the glass tube, a fourth hydrolytic resistance is determined at a fourth discrete section of the glass tube, a fifth hydrolytic resistance is determined at a fifth discrete section of the glass tube, a sixth hydrolytic resistance is determined at a sixth discrete section of the glass tube, a seventh hydrolytic resistance is determined at a seventh discrete section of the glass tube, and an eighth hydrolytic resistance is determined at an eighth discrete section of the glass tube, wherein the first discrete section, the second discrete section, the third discrete section, the fourth discrete section, the fifth discrete section, the sixth discrete section, the seventh discrete section, and the eighth discrete section are annular cross-sectional portions of the tube each extending at least 60 mm on the inner surface along the longitudinal axis, wherein the statistical results obtained for the hydrolytic resistance from the eight discrete sections of an individual glass tube are characterised by an interquartile range (IQR) is less than 0.08 µg cm$^{-2}$ mm$^{-1}$, or less than 0.06 µg cm$^{-2}$ mm$^{-1}$.

FIG. 1 shows, in a schematic sectional view, a manufacturing apparatus for a method according to an embodiment of the present invention.

The manufacturing apparatus 21 in FIG. 1 shows a device for drawing a glass tube 22 by the Danner method. The apparatus 21 comprises a feed tank 23 that contains a glass melt 24. In the feed tank, the glass melt 24 typically has a temperature of at least 900° C., preferably above 1000° C., and is applied via an outlet 25 onto an outer surface of a rotating conical mandrel 26 that is called a Danner pipe or Danner mandrel. The Danner mandrel may rotate about an axis essentially parallel to the drawing direction.

The conical mandrel 26 is obliquely downwardly inclined and driven by a power unit 27. The glass melt 24 flows from the outlet 25 on the outer surface of the conical mandrel 26 and forms thereon a hollow glass melt body 28. The position where the molten glass strand first touches the conical mandrel 26, while flowing from the outlet 25 towards the conical mandrel 26, is referred to as the wetting zone. The hollow glass melt body 28 is drawn from the conical mandrel 26 in a predetermined direction toward a front end. Additionally, compressed air is blown through the conical mandrel 26 to prevent the hollow glass melt body 28 from collapsing. At the front end of the conical mandrel 26 a so-called drawing onion 29 (in German: "Ziehzwiebel") is formed from which the glass tube 22 is made by hot forming.

The formed glass tube 22 is drawn over a line of support rollers 30 by a drawing device 31 situated up to 120 m away from the conical mandrel 26, thereby passing a monitoring unit 32 that monitors the glass tube 22 in regard to different quality parameters, for instance wall thickness, bubbles etc. At the end of the line, a cutting device 33 cuts the formed glass tube 22 into single glass tubes 34.

The wetting zone of the applied glass melt 24 is continuously recorded by a camera 35 to collect data of the melt flowing from the outlet 25. The collected data are analyzed by an analyzing unit (not shown). Based on the results at least one of the parameters selected from the group consisting of lateral position of the conical mandrel 26 relative to the outlet 25, vertical position of the conical mandrel 26 relative to the outlet 25, stirring speed in the feed tank 23, glass temperature, tilt angle of conical mandrel 26 and/or rotational speed of the conical mandrel 26 is adjusted in order to reduce a spatial variation of an edge of the glass strand in a direction essentially parallel to the drawing direction.

Figure 2:
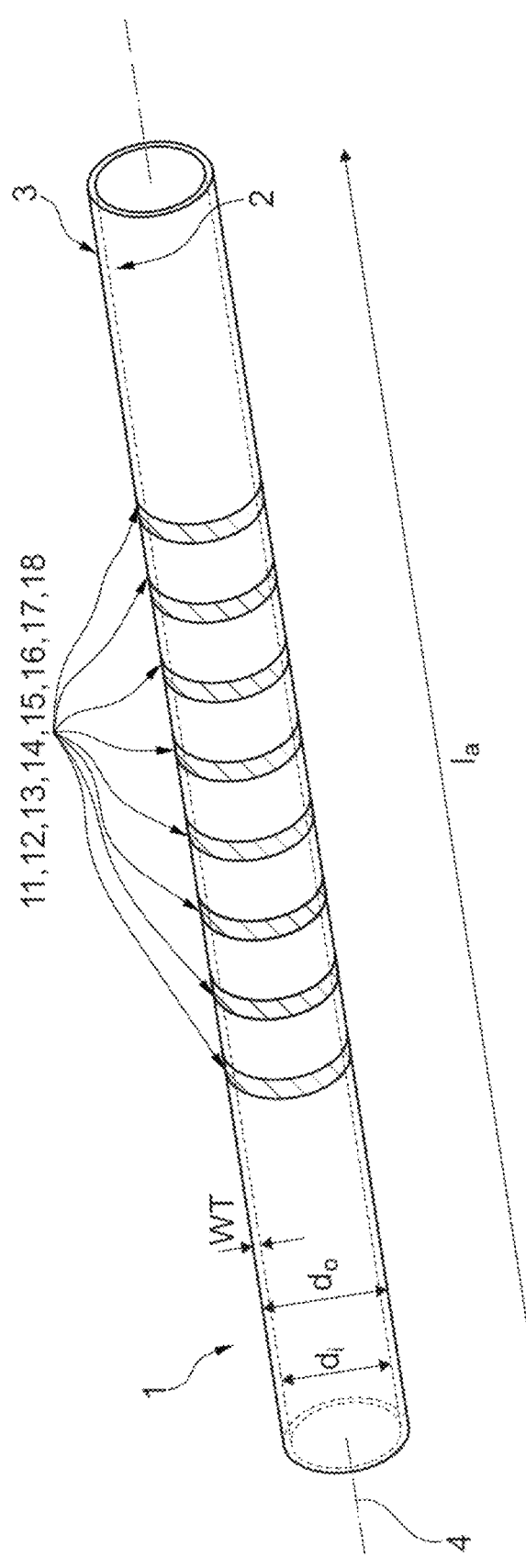
FIG. 2 shows a glass tube for pharmaceutical containers according to an embodiment of the present invention.

FIG. 2 shows a glass tube (1) having an outer diameter $d_o$, an inner diameter $d_i$, a length $l_a$ and a wall thickness WT. The glass tube has an inner surface (2), an outer surface (3) and a longitudinal axis (4), as well as a first discrete section (11), a second discrete section (12), a third discrete section (13), a fourth discrete section (14), a fifth discrete section (15), a sixth discrete section (16), a seventh discrete section (17), and an eighth discrete section (18). The eight discrete sections (11) to (18) are annular cross-sectional portions of the tube each extending at least 60 mm on the inner surface along the longitudinal axis, with the requirement that the two edges of typically around 100 mm length are excluded from the measurement based on a glass tube of typically around 1500 mm length. Among the eight discrete sections, there is no specific order and distance to each other required. There is no overlap between any of the eight discrete sections.

FIG. 3 shows a diagram graph illustrating the dimensions of the pipe head in combination with the glass melt during the drawing process into a glass tube. In a continuous process the reproduced parameters are stationary. $A_z$ (not shown) is the inner surface area of the initial glass tube section extending from the lower end of the pipe head, which stretches along a distance of 0.00 m to about 0.15 m downstream from the lower end of the pipe head, and covers a length $L_K$. $A_R$ (not shown) is the inner surface area of an equal mass of glass melt at about 0.8 m downstream from the lower end of the pipe head, and covers a length L.

Figure 4A:
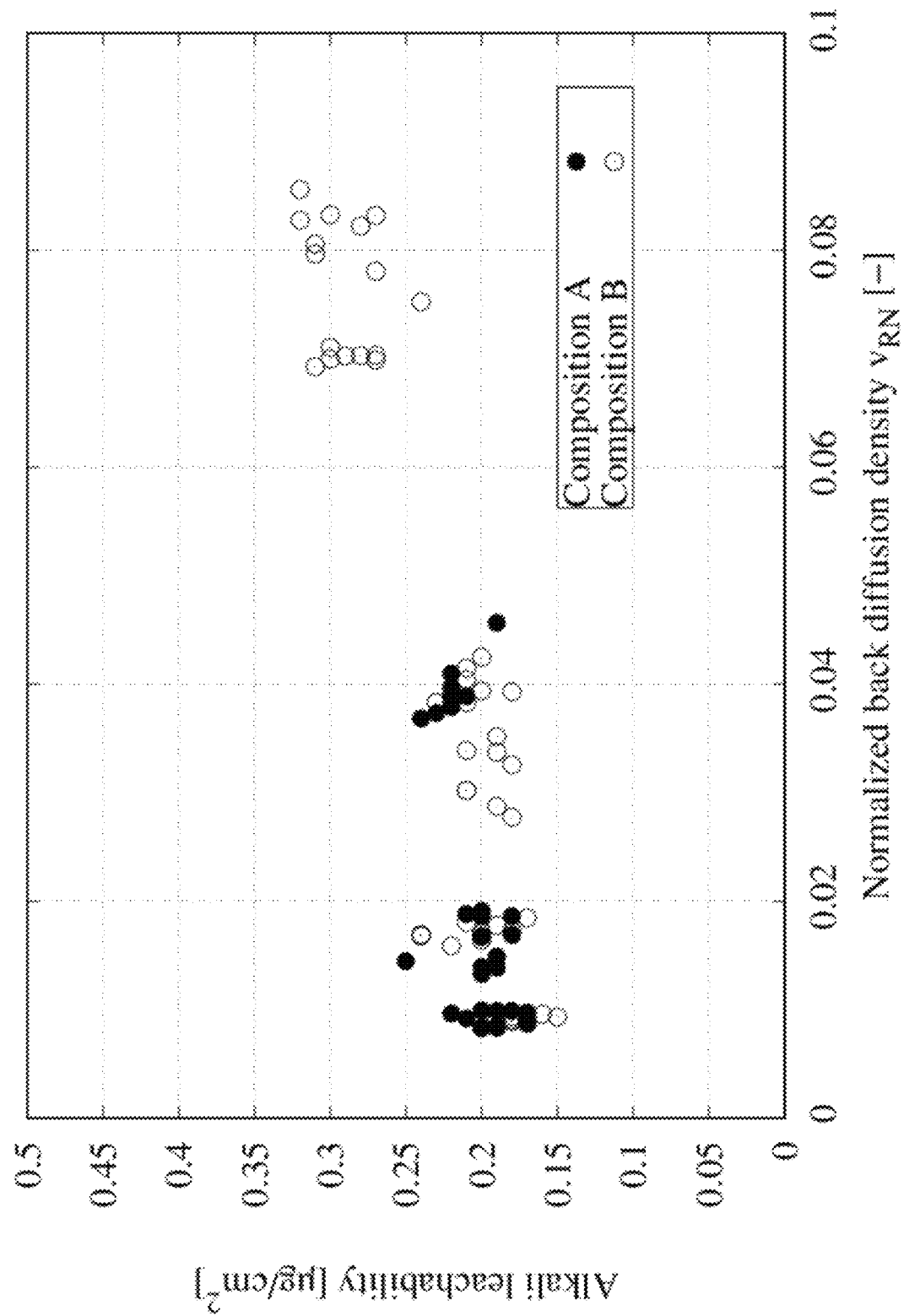
FIG. 4A shows the alkali leachability as a function of normalised back diffusion density for glass compositions A and B.
Figure 4B:
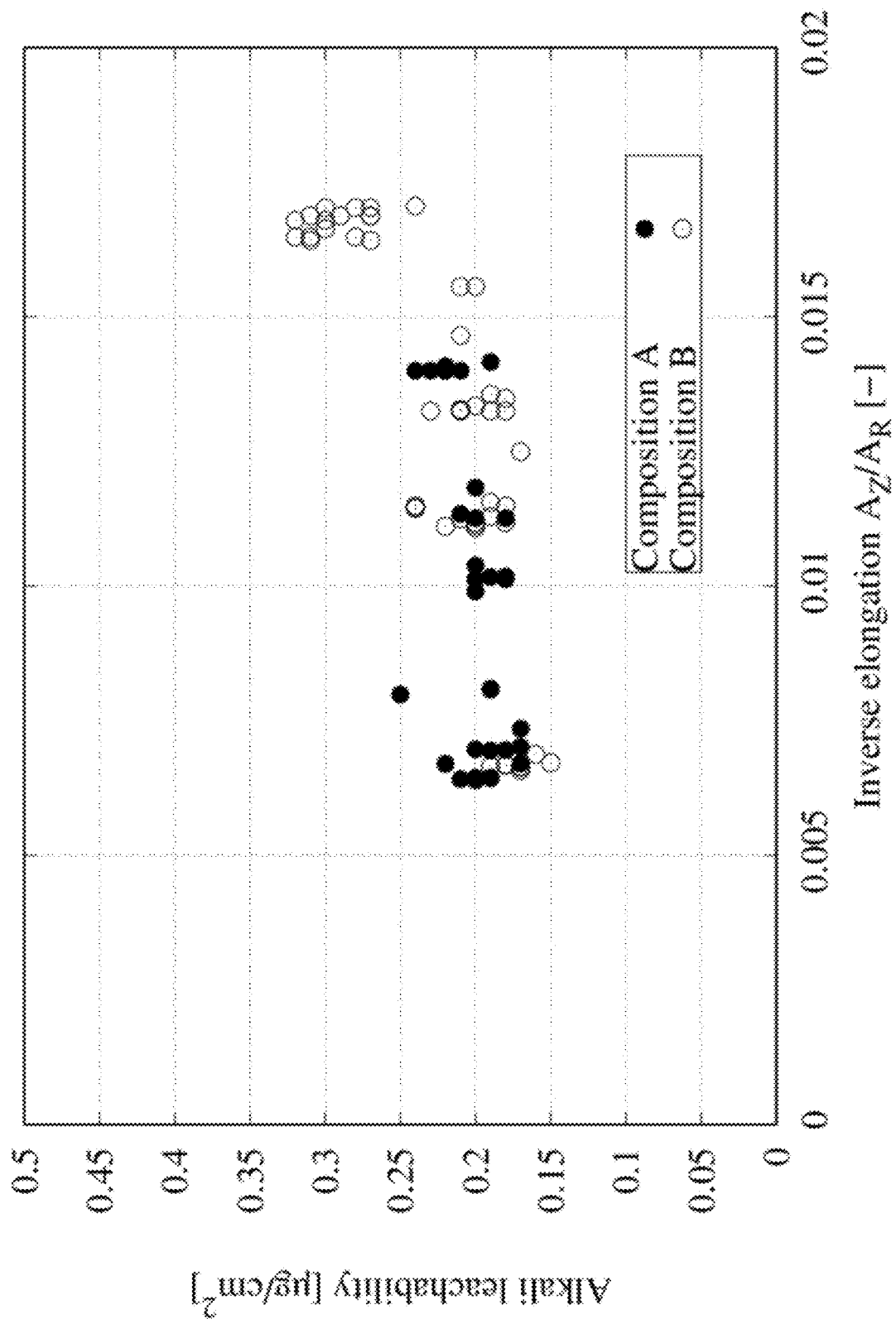
FIG. 4B shows the alkali leachability as a function of inverse elongation for glass compositions A and B.

FIG. 4A shows the alkali leachability as a function of the normalised back diffusion density and FIG. 4B shows the alkali leachability as a function of the inverse elongation for different glass compositions A and B. The inverse elongation has been steered via the adjustment of the temperature at the pipe head and the drawing speed.

FIGS. 5A-5D show the hydrolytic resistance for glass tubes produced from composition B as a function of the outer diameter $d_o$ and for different wall thicknesses WT.

Figure 5A:
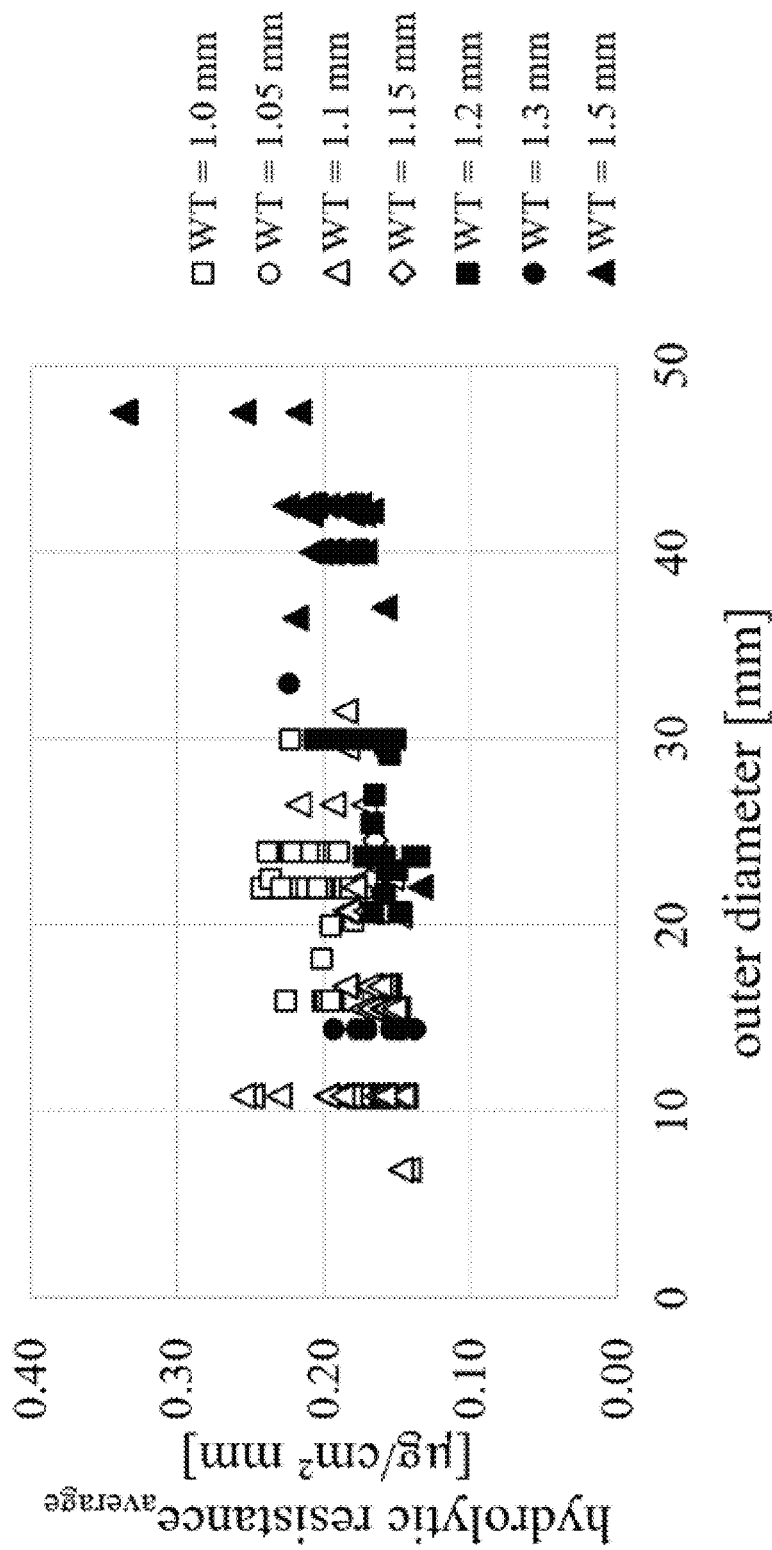
FIG. 5A shows average values of hydrolytic resistance determined at eight discrete sections for glass tubes produced from composition B as a function of the outer diameter $d_o$ and for different wall thicknesses WT.
Figure 5B:
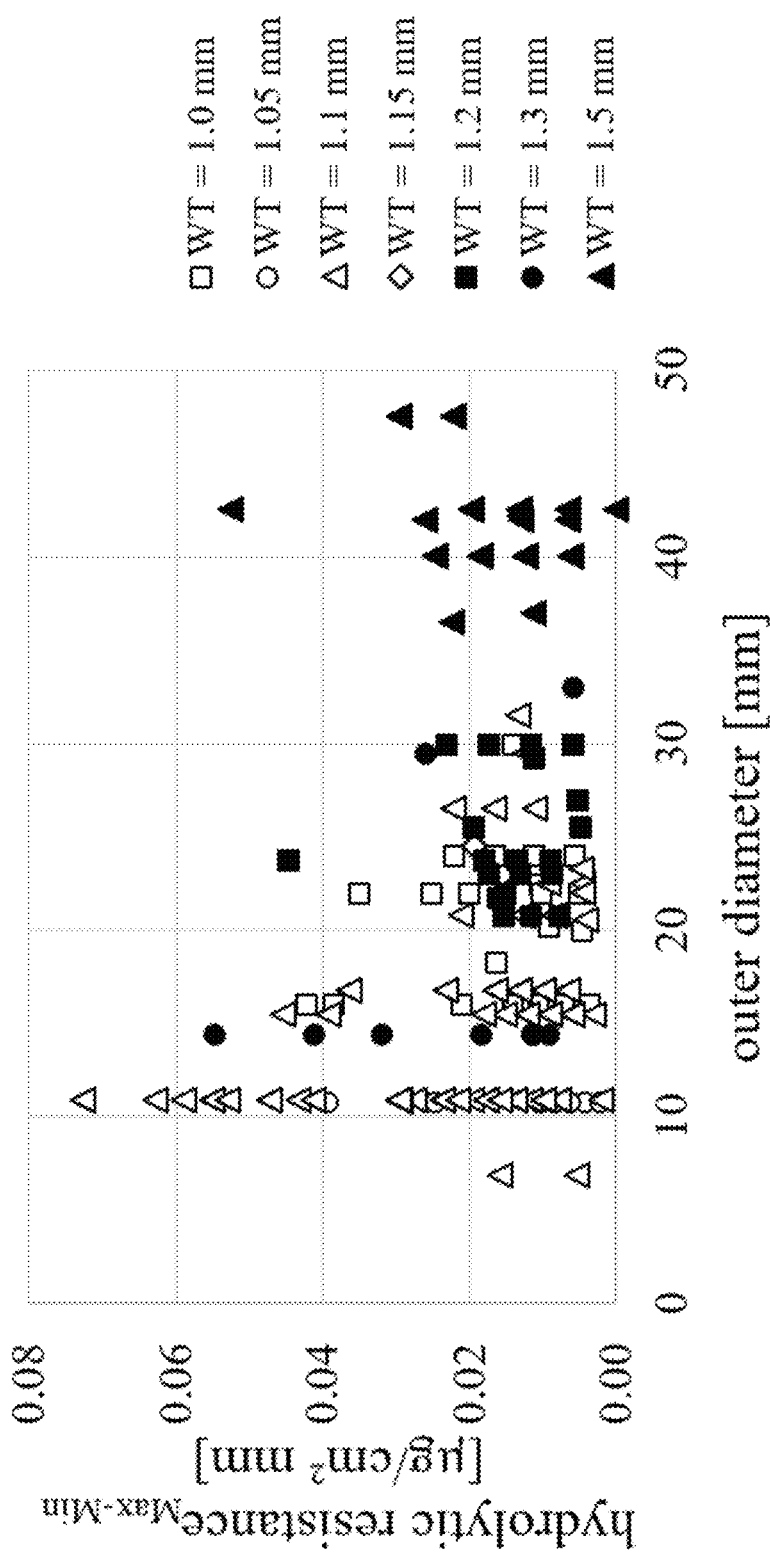
FIG. 5B shows an absolute difference of the hydrolytic resistance between the minimum value and the maximum value out of the eight discrete sections.
Figure 5C:
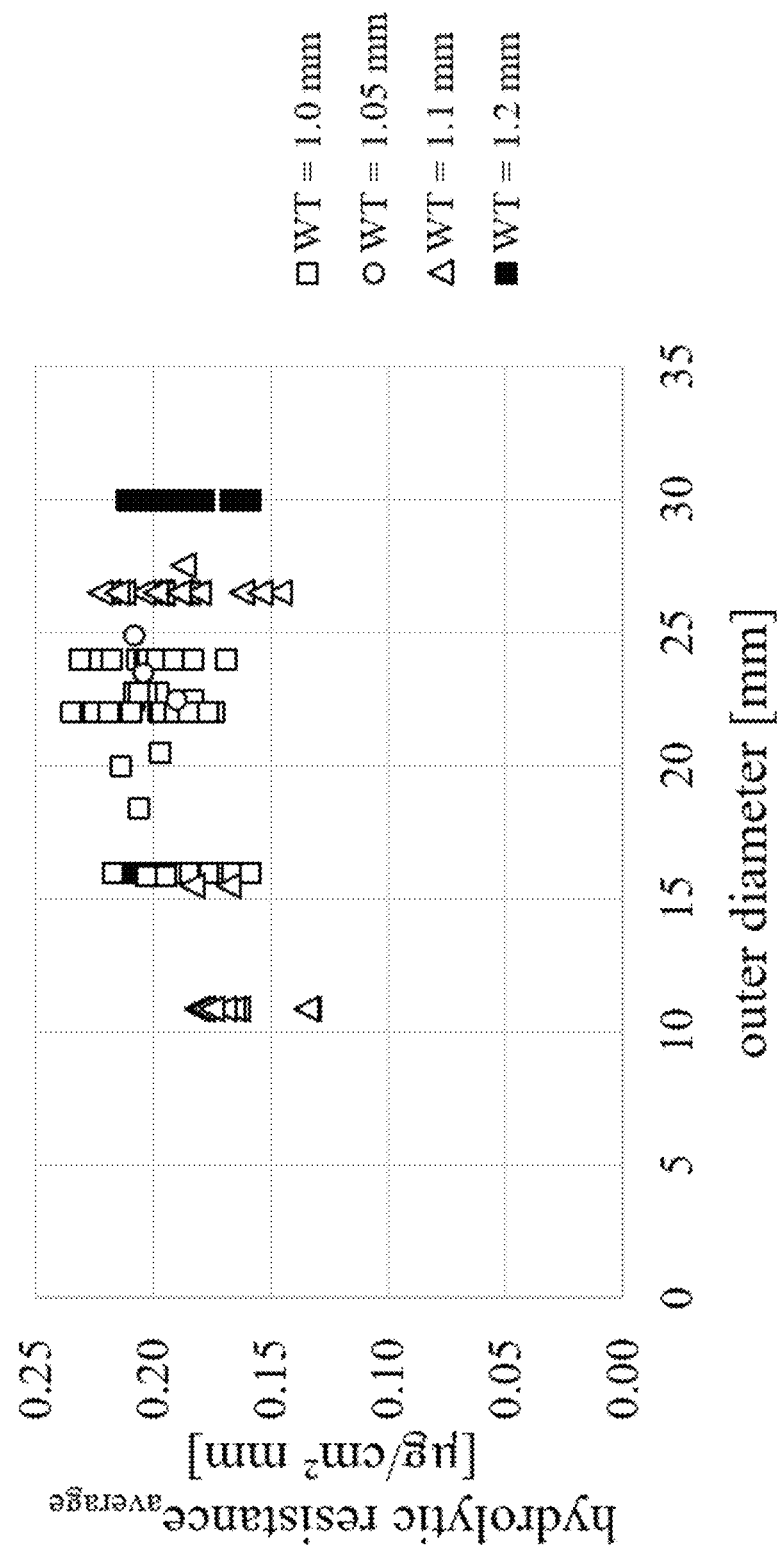
FIG. 5C shows average values of hydrolytic resistance as in FIG. 5A but for glass tubes produced from composition A according to the Danner process.
Figure 5D:
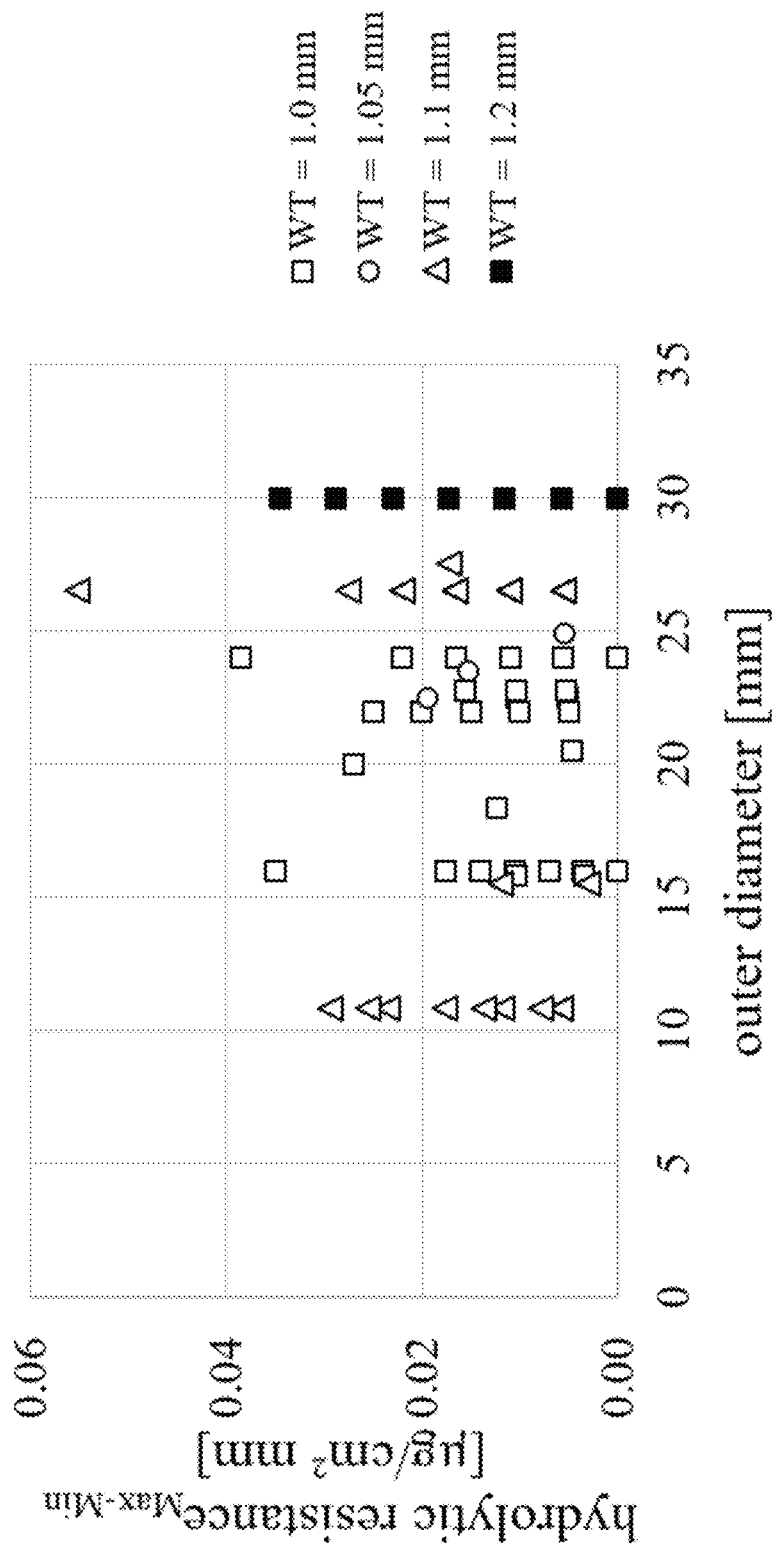
FIG. 5D shows an absolute difference of the hydrolytic resistance as in FIG. 5B but for glass tubes produced from composition A according to the Danner process.
Figure 6A:
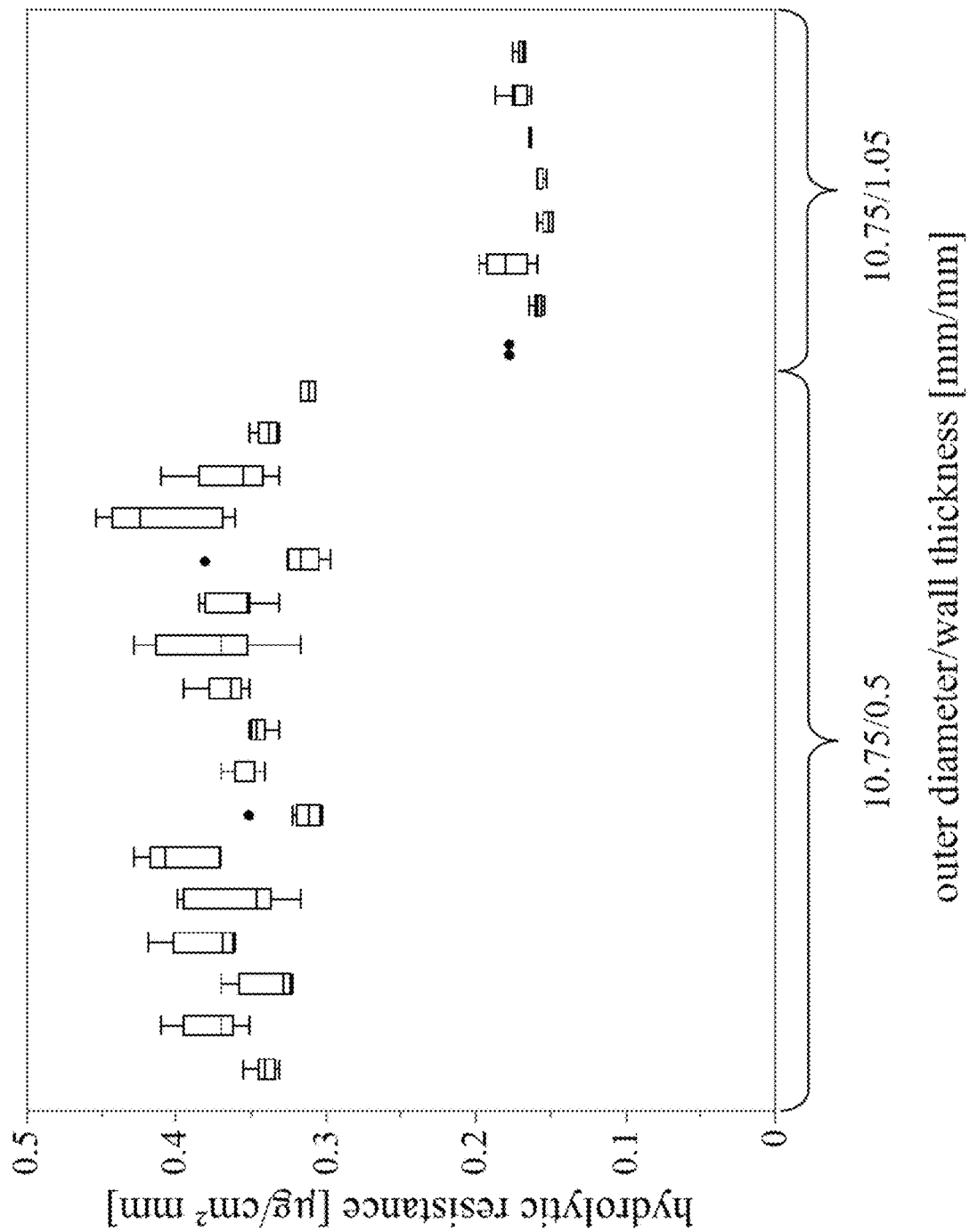
FIGS. 6A-D shows boxplots for hydrolytic resistance for individual glass tubes produced from composition B for different glass tube outer diameter $d_o$ and wall thickness WT, where each boxplot represents data from eight different segments subjected to hydrolytic resistance measurement.
Figure 6B:
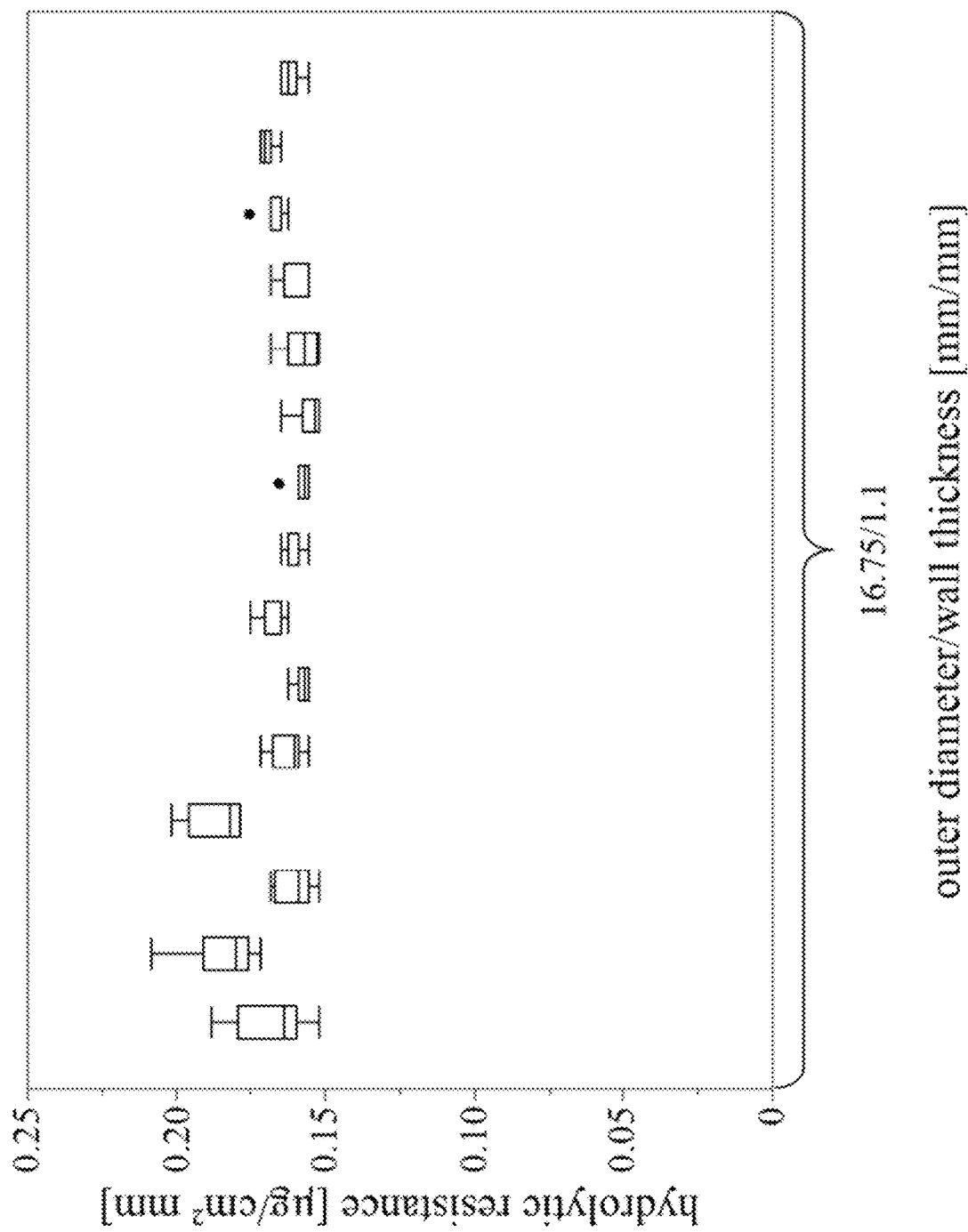
Figure 6C:
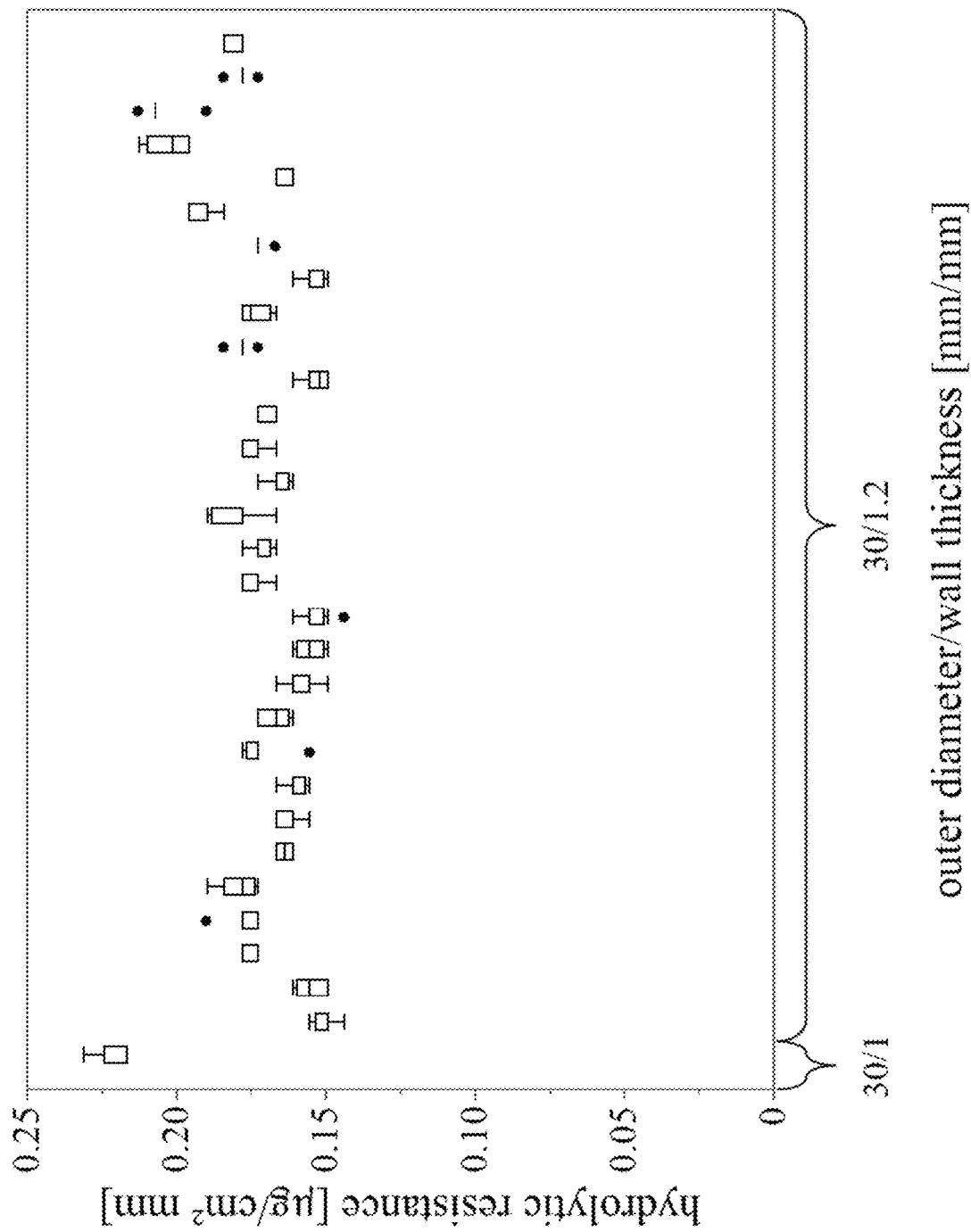
Figure 6D:
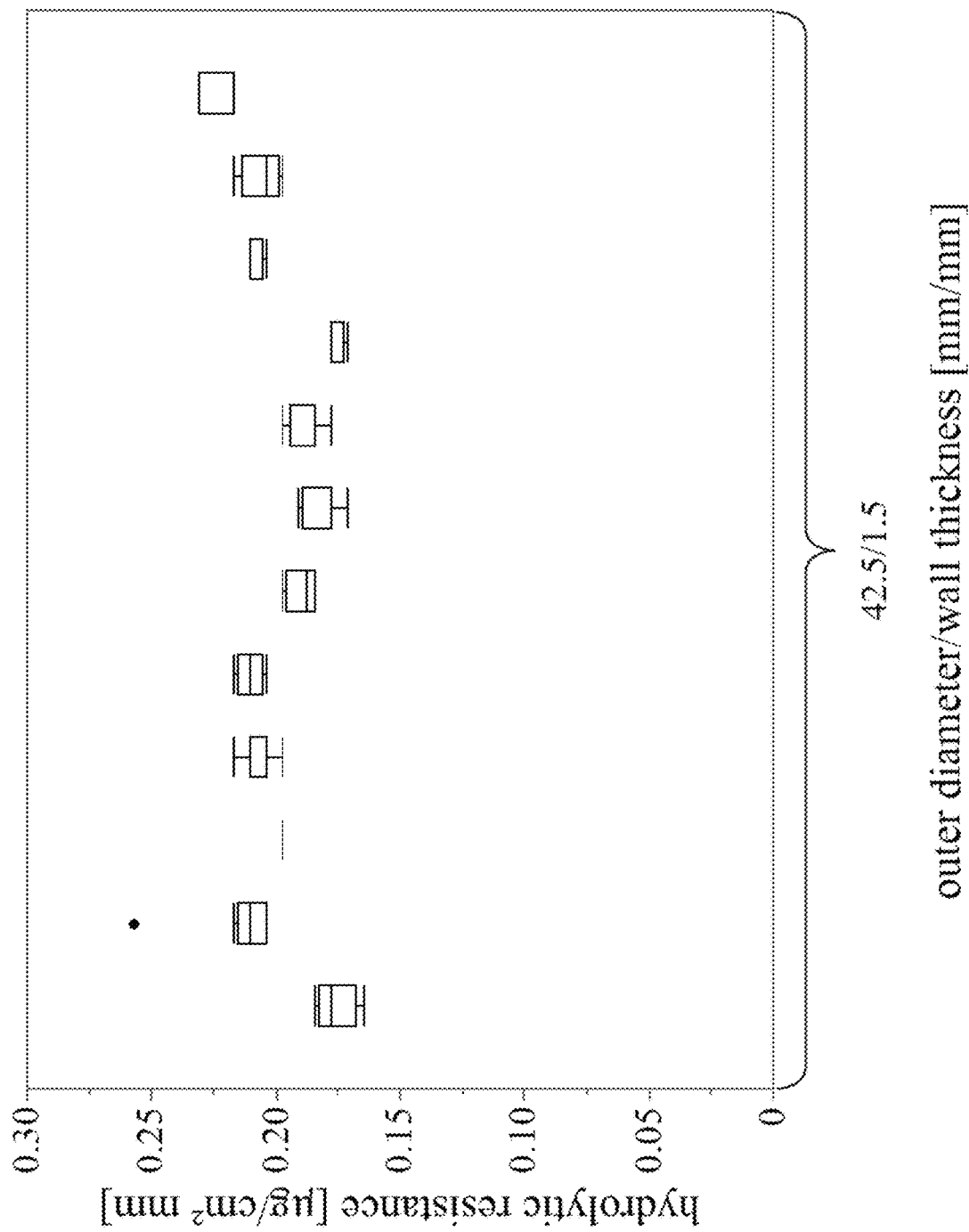

FIG. 5A shows average values of the hydrolytic resistance determined at eight discrete sections for a measured glass tube of specific dimensions, i.e., wall thickness WT and outer diameter $d_o$. Typically, the eight discrete sections are obtained from a glass tube of around 1500 mm length, with the requirement that the two edges of 100 mm length are excluded from the measurement. FIG. 5B shows the absolute difference of the hydrolytic resistance between the minimum value and the maximum value out of the eight discrete sections. FIGS. 5C and 5D show analogous data for the hydrolytic resistance for glass tubes produced from composition A according to the Danner process.

FIGS. 6A-6D are boxplots for the hydrolytic resistance for individual glass tubes produced from composition B for different glass tube dimensions, i.e., the outer diameter $d_o$ and wall thickness WT. Each boxplot represents data from eight different segments subjected to hydrolytic resistance measurement.

Manufacturing of Glass Tubes

Two borosilicate glass compositions have been used to manufacture glass tubes according to the invention which manufacturing process is based on a Danner process shown in FIG. 1. A normalised back diffusion density, controlled via the drawing speed and blow pressure in relation to the temperature at the pipe head, between 0.005 and 0.1 has been established. The thus manufactured glass tubes have been subjected to the hydrolytic resistance measurement (described in the following section). Referring to FIG. 4A, an increase in the normalised back diffusion density during the manufacture of the glass tubes correlates with an increase in the alkali leachability on the inner surface.

Hydrolytic Resistance

The hydrolytic resistance is measured on the inner surface of a glass tube and defined as the ratio of the alkali leachability on the inner surface to the wall thickness of the glass tube. The alkali leachability on the inner surface is determined as $Na_2O$ equivalents in an eluate prepared according to ISO 4802-2:2010. This measured parameter is then related to the inner surface that has been in contact with the eluate during the ISO 4802-2:2010 method and further divided by the wall thickness of the glass tube.

To perform the test glass tubes are cut in two to ten segments, each segment having a length of at least 60 mm, while alternatively also lengths of 75 mm and 100 mm are possible. Each glass tube typically has a length of at least about 1500 mm, and the segments are cut out from the glass tube, with the requirement that the two edges of 100 mm length are excluded from the measurement. For each test on individual glass tubes typically eight individual segments are measured and statistically analysed.

Referring to point 8.3 of ISO 4802-2:2010, each glass tube segment is capped from one open end, by definition referred to as the bottom end, with a silicone rubber plug. After filling with test water, the glass tube segment is capped at the other open end with aluminium foil. Before their first use, the silicone rubber plugs are cleaned, and the lack of alkali leachability from the silicone rubber plugs is confirmed. After each use the silicone rubber plugs are cleaned. The filling volume with distilled water is determined according to point 7.2.1 or point 7.2.2 of ISO 4802-2:2010 depending on the inner (or bore) diameter of the glass tube segment, i.e., $d_i \leq 20$ mm or $d_i > 20$ mm, respectively.

REFERENCE NUMERALS

| | |
|---|---|
| 1 | Glass tube |
| 2 | inner surface |
| 3 | outer surface |
| 4 | longitudinal axis |
| $d_i$ | inner diameter |
| $d_o$ | outer diameter |
| $l_a$ | length |
| WT | wall thickness |
| 11 | first discrete section |
| 12 | second discrete section |
| 13 | third discrete section |
| 14 | fourth discrete section |
| 15 | fifth discrete section |
| 16 | sixth discrete section |
| 17 | seventh discrete section |
| 18 | eighth discrete section |
| 21 | manufacturing apparatus |
| 22 | glass tube |
| 23 | feed tank |
| 24 | glass melt |
| 25 | outlet |
| 26 | conical mandrel |
| 27 | power unit |
| 28 | hollow glass melt body |
| 29 | drawing onion |
| 30 | line of support rollers |
| 31 | drawing device |
| 32 | monitoring unit |
| 33 | cutting device |
| 34 | single glass tubes |
| 35 | camera |

What is claimed is:

1. A glass tube for pharmaceutical containers, comprising:
a wall made of glass, the wall having an inner surface with an inner diameter ($d_i$) and an outer surface with an outer diameter ($d_o$), the outer diameter ($d_o$) being from 6 mm to 55 mm;
a thickness of the wall defined between the inner and outer diameters ($d_i$, $d_o$), the thickness being between 0.4 mm to 2.5 mm;
a length ($l_a$) defined along a longitudinal axis from a first edge to a second edge, the length ($l_a$) being from 500 to 3500 mm, wherein the first edge and the second edge extend 6.67% of the length ($l_a$);
a first discrete section configured as a first annular cross-sectional portion that extends on the inner surface at least 60 mm along the longitudinal axis and extends on the inner surface between the first and second edges;
a second discrete section configured as a second annular cross-sectional portion that extends on the inner surface at least 60 mm along the longitudinal axis and extends on the inner surface between the first and second edges, wherein the first and second discrete sections do not overlap one another;
a first hydrolytic resistance comprising a ratio of a first alkali leachability of the glass of the inner surface in the first discrete section to the thickness;
a second hydrolytic resistance comprising a ratio of a second alkali leachability of the glass of the inner surface in the second discrete section to the thickness, wherein the first and second alkali leachabilities being determined as $Na_2O$ equivalents in an eluate prepared according to ISO 4802-2:2010; and
an absolute difference of the first and second hydrolytic resistances that is less than 0.20 μg $cm^{-2}$.

2. The glass tube of claim 1, wherein the thickness is between 1.0 mm to 1.8 mm.

3. The glass tube of claim 1, wherein the absolute difference is less than 0.15 μg $cm^{-2}$ $mm^{-1}$.

4. The glass tube of claim 1, wherein the absolute difference is less than 0.10 μg $cm^{-2}$ $mm^{-1}$.

5. The glass tube of claim 1, wherein the outer diameter ($d_o$) is 20 mm to 35 mm.

6. The glass tube of claim 1, wherein the first hydrolytic resistance and/or the second hydrolytic resistance is less than 0.5 μg $cm^{-2}$ $mm^{-1}$.

7. The glass tube of claim 1, wherein the first hydrolytic resistance and/or the second hydrolytic resistance is less than 0.4 μg $cm^{-2}$ $mm^{-1}$.

8. The glass tube of claim 1, wherein the first hydrolytic resistance and/or the second hydrolytic resistance is less than 0.3 μg $cm^{-2}$ $mm^{-1}$.

9. The glass tube of claim 1, wherein the first hydrolytic resistance and/or the second hydrolytic resistance is less than 0.1 μg $cm^{-2}$ $mm^{-1}$.

10. The glass tube of claim 1, wherein the thickness is 1.0 mm to 2.0 mm, and wherein the first hydrolytic resistance and/or the second hydrolytic resistance is less than 0.3 μg $cm^{-2}$ $mm^{-1}$.

11. The glass tube of claim 1, wherein the thickness is 2.0 mm to 2.5 mm, and wherein the first hydrolytic resistance and/or the second hydrolytic resistance is less than 0.2 μg $cm^{-2}$ $mm^{-1}$.

12. The glass tube of claim 1, wherein the outer diameter ($d_o$) is 16 mm to 55 mm, and wherein the first hydrolytic resistance and/or the second hydrolytic resistance is less than 0.30 μg $cm^{-2}$ $mm^{-1}$.

13. The glass tube of claim 1, wherein the glass comprises a glass composition selected from a group consisting of soda-lime glass, borosilicate glass, aluminosilicate glass, and glass comprising from 5 to 20 mol % $B_2O_3$ based on all oxides present in the glass composition.

14. The glass tube of claim 1, wherein the glass comprises a glass composition comprising 60 to 85 mol % $SiO_2$, 5 to 20 mol % $B_2O_3$, 2 to 10 mol % $Al_2O_3$, 0 to 2 mol % $Fe_2O_3$, 2 to 10 mol % $Na_2O$, 0 to 5 mol % $K_2O$, 0 to 2 mol % BaO, 0 to 2 mol % CaO, and 0 to 10 mol % $TiO_2$ based on all oxides present in the glass composition.

15. The glass tube of claim 1, wherein the inner diameter ($d_i$) is from 4 to 51 mm.

16. The glass tube of claim 1, further comprising:
third through eighth discrete sections each configured as annular cross-sectional portions that extend on the inner surface at least 60 mm along the longitudinal axis and extend on the inner surface between the first and second edges, wherein the first through eighth discrete sections do not overlap one another;
third through eighth hydrolytic resistances each comprising a ratio of alkali leachabilities of the glass of the inner surface in the third through eighth discrete sections, respectively, to the thickness, wherein the third through eighth alkali leachabilities are each determined as $Na_2O$ equivalents in an eluate prepared according to ISO 4802-2:2010; and
an interquartile range (IQR) for the first through eighth hydrolytic resistances of less than 0.08 μg $cm^{-2}$ $mm^{-1}$.

17. The glass tube of claim 16, wherein the interquartile range (IQR) is less than 0.06 μg $cm^{-2}$ $mm^{-1}$.

18. A set of glass tubes, comprising a plurality of the glass tubes of claim 16, wherein the plurality is at least 50, and wherein the interquartile range (IQR) of at least 80% of the plurality of the glass tubes is less than 0.04 μg $cm^{-2}$ $mm^{-1}$.

19. The set of glass tubes of claim 18, wherein the interquartile range (IQR) of at least 80% of the plurality of the glass tubes is less than 0.03 µg cm$^{-2}$ mm$^{-1}$.

20. The set of glass tubes of claim 18, further comprising no data points outside a range spanned by an upper whisker and a lower whisker, wherein the lower whisker is at a distance within 1.5 times the interquartile range (IQR) and represents a value closest to 1.5 times the interquartile range (IQR) measured below a first quartile, and wherein the upper whisker is at a distance within 1.5 times the interquartile range (IQR) and represents a value closest to 1.5 times the interquartile range (IQR) measured above a third quartile.

21. A glass tube for pharmaceutical containers, comprising:
- a wall made of glass, the wall having an inner surface with an inner diameter ($d_i$) and an outer surface with an outer diameter ($d_o$), the outer diameter ($d_o$) being from 6 mm to 55 mm;
- a thickness of the wall defined between the inner and outer diameters ($d_i$, $d_o$), the thickness being between 0.4 mm to 2.5 mm;
- a length ($l_a$) defined along a longitudinal axis, the length ($l_a$) being from 500 to 3500 mm;
- a first discrete section configured as a first annular cross-sectional portion that extends on the inner surface at least 60 mm along the longitudinal axis;
- a second discrete section configured as a second annular cross-sectional portion that extends on the inner surface at least 60 mm along the longitudinal axis, wherein the first and second discrete sections do not overlap one another;
- a first hydrolytic resistance comprising a ratio of a first alkali leachability of the glass of the inner surface in the first discrete section to the thickness;
- a second hydrolytic resistance comprising a ratio of a second alkali leachability of the glass of the inner surface in the second discrete section to the thickness, wherein the first and second alkali leachabilities being determined as Na$_2$O equivalents in an eluate prepared according to ISO 4802-2:2010; and
- an absolute difference of the first and second hydrolytic resistances that is greater than 0 µg cm$^{-2}$ and less than 0.20 µg cm$^{-2}$.

* * * * *